United States Patent [19]
Sanjurjo et al.

[11] Patent Number: 6,039,894
[45] Date of Patent: Mar. 21, 2000

[54] PRODUCTION OF SUBSTANTIALLY MONODISPERSE PHOSPHOR PARTICLES

[75] Inventors: Angel Sanjurjo, San Jose; Kai-Hung Lau, Cupertino; David Lowe, Hayward; Anastasia Canizales, San Francisco; Naixiong Jiang, Palo Alto; Victor Wong, Daly City; Liqiang Jiang, San Jose; Luke V. Schneider, Half Moon Bay; Naheed Mufti, Castro Valley; Robert T. Rewick, Mountain View, all of Calif.; Marie Johansson, Watchung, N.J.; Keith Kardos, Bethlehem, Pa.

[73] Assignees: SRI International, Mento Park, Calif.; STC Technologies, Bethlehem, Pa.

[21] Appl. No.: 08/986,196

[22] Filed: Dec. 5, 1997

[51] Int. Cl.$^7$ .................................................. C09K 11/00
[52] U.S. Cl. .................... 252/301.4 R; 427/213; 427/215; 427/255; 252/301.4 S; 252/301.4 H; 252/301.4 R; 252/301.4 P; 252/301.5; 252/301.6 R; 252/301.6 S; 252/301.6 F; 252/301.6 P
[58] Field of Search ...................... 427/213, 215, 427/255; 252/301.4 R, 301.4 S, 301.4 H, 301.6 S, 301.4 P, 301.5, 301.6 R, 301.6 P

[56] References Cited

U.S. PATENT DOCUMENTS

| | | | |
|---|---|---|---|
| 2,944,177 | 7/1960 | Piper | 313/108 |
| 3,148,246 | 9/1964 | Royce | 252/301.4 S |
| 3,264,133 | 8/1966 | Brooks | 117/33.5 |
| 3,408,233 | 10/1968 | Parker et al. | 136/153 |
| 3,418,246 | 12/1968 | Royce | 252/301.4 |

(List continued on next page.)

FOREIGN PATENT DOCUMENTS

| | | |
|---|---|---|
| 936351 | 11/1973 | Canada . |
| 0 221 562 | 5/1987 | European Pat. Off. . |
| 1915288 | 11/1969 | Germany . |
| 1178583 | 7/1989 | Japan . |
| WO 96/01297 | 1/1996 | WIPO . |
| 97/46488 | 12/1997 | WIPO . |
| WO97/46488 | 12/1997 | WIPO . |
| WO 98/36887 | 8/1998 | WIPO . |

OTHER PUBLICATIONS

Auzel et al., "Rare Earth Doped Vitroceramics: New, Efficient, Blue and Green Emitting Materials for Infrared Up–Conversion," J. Electrochem. Soc., vol. 122, No. 1, pp. 101–107 Jan., 1975.

Bhargava et al., "Optical Properties of Manganese–Doped Nanocrystals of ZnS," Physical Review Letter, vol. 72, No. 3, pp. 416–419 Jan. 17, 1994.

Franz et al., "Luminescent Materials," Luminescent Materials, vol. A15, pp. 519–557. no date.

Sordelet et al., "Preparation of Spherical, Monosized $Y_2O_3$ Precursor Particles," Journal of Colloid, vol. 122, No. 1, pp. 47–59 Mar. 1988.

Xu et al., "Submicron–sited Spherical Yttrium Oxide Based Phosphors Prepared by Supercritical $CO_2$–assisted Aerosolization and Pyrolysis," App. Physics Letters, vol. 71, Iss. 12, pp. 1643–1645 (1997), (Abstract). no month.

(List continued on next page.)

*Primary Examiner*—C. Melissa Koslow
*Attorney, Agent, or Firm*—Morgan, Lewis & Bockius LLP

[57] ABSTRACT

The invention relates to a method for producing activated, substantially monodisperse, phosphorescent particles and particles formed thereby. The method suspends substantially monodisperse, phosphor-precursor particles in a fluidizing gas and then introduces a reactive gas to contact the suspended phosphor-precursor particles. Heating the suspended phosphor-precursor particles to a reaction temperature then forms unactivated phosphorescent particles. In another embodiment, the phosphor-precursor particles may be heated to a reaction temperature where they decompose to form the unactivated phosphor particles. The unactivated phosphorescent particles suspended within the fluidizing gas are activated by heating the unactivated phosphorescent particles to an activation temperature forming activated, substantially monodisperse, phosphorescent particles.

41 Claims, 5 Drawing Sheets

U.S. PATENT DOCUMENTS

| | | | |
|---|---|---|---|
| 3,541,018 | 11/1970 | Hewes et al. | 252/301.4 H |
| 3,923,682 | 12/1975 | Dale et al. | 252/301.4 R |
| 4,143,297 | 3/1979 | Fischer | 313/502 |
| 4,181,753 | 1/1980 | Fischer | 427/64 |
| 4,263,339 | 4/1981 | Fischer | 427/64 |
| 4,585,673 | 4/1986 | Sigai | 252/301.4 P |
| 4,612,383 | 9/1986 | Laine et al. | 556/412 |
| 4,690,832 | 9/1987 | Yale | 427/65 |
| 4,788,309 | 11/1988 | Laine et al. | 556/412 |
| 4,825,124 | 4/1989 | Sigai | 313/486 |
| 4,952,715 | 8/1990 | Blum et al. | 556/409 |
| 4,956,202 | 9/1990 | Kasenga et al. | 427/215 |
| 4,990,371 | 2/1991 | Dutta et al. | 427/213 |
| 5,008,422 | 4/1991 | Blum et al. | 556/412 |
| 5,015,452 | 5/1991 | Matijevic | 423/263 |
| 5,055,431 | 10/1991 | Blum et al. | 501/97 |
| 5,128,494 | 7/1992 | Blum | 556/457 |
| 5,149,514 | 9/1992 | Sanjurjo | 423/344 |
| 5,151,215 | 9/1992 | Sigai | 252/301.6 F |
| 5,156,885 | 10/1992 | Budd | 427/70 |
| 5,171,734 | 12/1992 | Sanjurjo et al. | 505/1 |
| 5,246,738 | 9/1993 | Blum | 427/387 |
| 5,273,774 | 12/1993 | Karam et al. | 427/64 |
| 5,277,245 | 1/1994 | Dutta et al. | 165/104.16 |
| 5,309,071 | 5/1994 | Karam et al. | 313/509 |
| 5,319,121 | 6/1994 | Blum | 556/457 |
| 5,322,913 | 6/1994 | Blum et al. | 528/15 |
| 5,405,655 | 4/1995 | Blum et al. | 427/387 |
| 5,418,062 | 5/1995 | Budd | 428/403 |
| 5,439,705 | 8/1995 | Budd | 427/212 |
| 5,635,250 | 6/1997 | Blum et al. | 427/387 |
| 5,674,698 | 10/1997 | Zarling et al. | 435/7.92 |
| 5,688,438 | 11/1997 | Chadha | 252/301.4 F |
| 5,698,397 | 12/1997 | Zarling et al. | 435/6 |
| 5,736,410 | 4/1998 | Zarling et al. | 436/172 |
| 5,981,361 | 4/1999 | Kane | 252/301.4 H |

OTHER PUBLICATIONS

Keller et al. "Studies on Some Infrared Stimulable Phosphors," Physical Review, vol. 108, No. 3, pp. 663–676. Nov. 1, 1957.

Yu et al., "Optical Properties of Homogeneously Mn–Doped ZnS Nano–Particles," Dept. of Applied Chemistry, pp. 245–250. no date.

"Zinc and Cadmium Sulphides," Inorganic and Theoretical Chemistry, pp. 586–612. no date.

Beverloo et al., "Inorganic Phosphors as New Luminescent Labels for Immunocytochemistry and Time–Resolved Microscopy," Cytometry, vol. 11, pp. 784–792 (1990). no month.

Kanehisa et al., "Formation Process of $Y_2O_2S:Eu^{3+}$ in a Preparation with Flux," J. Electrochemical Soc., vol. 132, No. 8, pp. 2023–2027 (1985). no month.

(Abstract No. 84:143780z) Lipp, Steven A., "Chemical Vapor Deposition of Luminescent Films," *76–Electric Phenomena*, University of California, vol. 84, p. 583, 1976. no month.

B. J. Wood et al., "Coating Particles by Chemical Vapor Deposition in Fluidized Bed Reactors," *Surface and Coatings Technology*, vol. 49, pp. 228–232, 1991. no month.

A. Sanjurjo et al., "Chemical Vapor Deposition in Fluidized Bed Reactors," SRI International, pp. 1–14, 1990. no month.

Xu et al, abstract for "Submicron–sited Spherical Yttrium Oxide Based Phosphors by Supercritical CO2–assisted Aerosolization and Pyrolysis", 1997 no month.

PRODUCTION OF SUBSTANTIALLY MONODISPERSE PHOSPHOR PARTICLES

FIELD OF THE INVENTION

This invention relates to the production of phosphorescent particles. More particularly, the invention relates to the production of substantially monodisperse phosphorescent particles, even phosphorescent particles less than one micron in size.

BACKGROUND OF THE INVENTION

Inorganic luminescent or electromagnetically active materials are crystalline compounds that absorb energy acting upon them and subsequently emit the absorbed energy. Light emission is known as luminescence. A material which continues to emit light for greater than $10^{-8}$ seconds after the removal of the exciting energy is said to be phosphorescent. Phosphorescent substances are also known as phosphors, and as lumiphors. In contrast to phosphorescent substances, substances in which the emission of light ceases immediately or within $10^{-8}$ seconds after excitation are said to be fluorescent substances. The half-life of the afterglow of a phosphor will vary with the substance and typically ranges from $10^{-6}$ seconds to days.

Phosphors may generally be categorized as stokes (down-converting) phosphors or anti-stokes (up-converting) phosphors. Phosphors which absorb energy in the form of a photon and transmit a lower frequency band photon are down-converting phosphors. In contrast, phosphors which absorb energy in the form of two or more photons in a low frequency and emit in a higher frequency band are up-converting phosphors. Phosphors may also be categorized according to the nature of the energy which excites the phosphor. For example, phosphors which are excited by low energy photons are called photoluminescent and phosphors which are excited by cathode rays are called cathodluminescent. Other electromagnetically active particles include pigments and radio frequency absorbers.

Phosphors are employed in a wide variety of applications. Such applications include, but are not limited to, coding of mass-produced goods or high value trademarked articles, printing inks, biological assays, general lighting, safety lighting, x-ray machines, cosmetic dentistry and in cathode-ray tubes, such as in television and computer monitor screens. These and other applications are described in more detail in Luminescent Materials, Ullmann's Encyclopedia of Industrial Chemistry, 5th Edition, Vol. A15, pgs. 519–557, the disclosure of which is incorporated by reference herein.

The requirements for phosphors have become more and more stringent with smaller and smaller phosphor particles being required. For example, phosphor particles may be used in ink compositions for use in ink jet printers which requires the coating or encapsulation of the phosphor particles such that they can be suspended in an ink formulation. Phosphor particles are required to have a diameter in the range of one micron or less in order to be suspended in an ink formulation. Computer monitors are another example of the need for smaller phosphor particles. Computer monitors require higher resolution than conventional television screens. In order to achieve higher resolutions, smaller phosphor particles are often needed. Biological assays are another example of an application which requires monodispersity as well as small particle size phosphors. Current methods of producing phosphor particles need significant improvement to meet the challenges presented in the production of small phosphor particles.

Typically, phosphor particles are produced by first precipitating amorphous, generally spherical, unactivated, phosphor particles from solution. These precipitated particles are unactivated phosphors in the sense that they exhibit little or no phosphorescence. To improve the phosphorescence of the precipitated particles, the precipitated particles have been fired in fixed bed furnaces, optionally in the presence of reactive fluxes.

The unactivated phosphor particles are fired in a fixed bed furnace at temperatures ranging from 900 to 1600° C. in order to change the crystalline lattice structure of the particle. The fixed bed furnace normally comprises a means of heating a crucible or boat in a closed environment, such as an alumina-lined quartz tube, a cold wall quartz reactor or a quartz-lined reactor. The types of materials used for the crucibles and boats have an important effect upon the formation of the activated phosphor. For example, boron nitride, molybdenum and nylon capped boats have been attempted but cause metal impurity contamination. In contrast, quartz and alumina boats and platinum crucibles have generally proven satisfactory to prevent such contamination. Unfortunately, firing the unactivated phosphor particles in a fixed bed causes the particles to agglomerate, increasing the overall particle size.

Optionally, a reactive flux may be present in the fixed bed furnace. A reactive flux material is a substance that promotes the fusing of the phosphors and the reactive material contained in the flux. A reactive flux can also promote activation of the unactivated phosphor particles at lower temperatures. The reactive flux material may be a gas, liquid or solid. However, the presence of a reactive flux in a fixed bed process requires an additional process step to remove the flux from the final phosphor particle. Removing the reactive flux often deteriorates the surface of the phosphor particles and impairs the phosphor's efficiency. Furthermore, the reactive fluxes often causes the phosphor particles to fuse together yielding agglomerated phosphor particles rather than monodisperse phosphor particles.

As mentioned above, phosphor particles which have been fired in a fixed bed, especially those fired in the presence of a reactive flux, tend to form hard agglomerates. Typically, fixed bed phosphor production methods produce less than about 0.1% monodisperse submicron phosphor particles. The agglomeration substantially increases the overall particle size. In order to achieve the desired smaller particle sizes, phosphor particles formed by the fixed bed process are milled or crushed. These crushed particles are then sieved such that a particle size of phosphor may be obtained. However, the milling or crushing of phosphor particles into smaller sizes often results in a decrease in their phosphorescent properties.

When phosphor particles are milled or crushed the crystalline lattice structure of the phosphor particle can become fractured and exhibit lower emission conversion efficiency. For example, crushing a phosphor particle to reduce size can decrease the efficiency of the phosphor by 75% as compared to the uncrushed phosphor particle. Indeed, the yield of useable submicron phosphor material can be less than 1% after firing unactivated phosphor particles in a fixed bed followed by milling the resulting activated phosphors. Thus, there exists a need in the art for a process which is capable of producing activated phosphor particles which do not form agglomerates requiring milling or crushing.

SUMMARY OF THE INVENTION

The invention answers the need for producing activated, substantially monodisperse, phosphorescent particles. The method of the invention suspends substantially monodisperse, phosphor-precursor particles in a fluidizing gas and then introduces a reactive gas to contact the suspended phosphor-precursor particles. Heating the suspended phosphor-precursor particles to a reaction temperature then forms unactivated phosphorescent particles. The introduction of the reactive gas is then discontinued. The unactivated phosphorescent particles suspended within the fluidizing gas are activated by heating the unactivated phosphorescent particles to an activation temperature forming activated, substantially monodisperse, phosphorescent particles.

The activated, substantially monodisperse, phosphorescent particles formed by the method of the invention can be employed in a wide variety of applications. For example, activated, substantially monodisperse, phosphorescent particles may be used in ink compositions, biological assays, coding of mass-produced goods or high value trademarked articles, general lighting, safety lighting, x-ray machines, cosmetic dentistry and in cathode-ray tubes, such as in television and computer monitor screens.

DETAILED DESCRIPTION OF THE INVENTION

Figure 1:
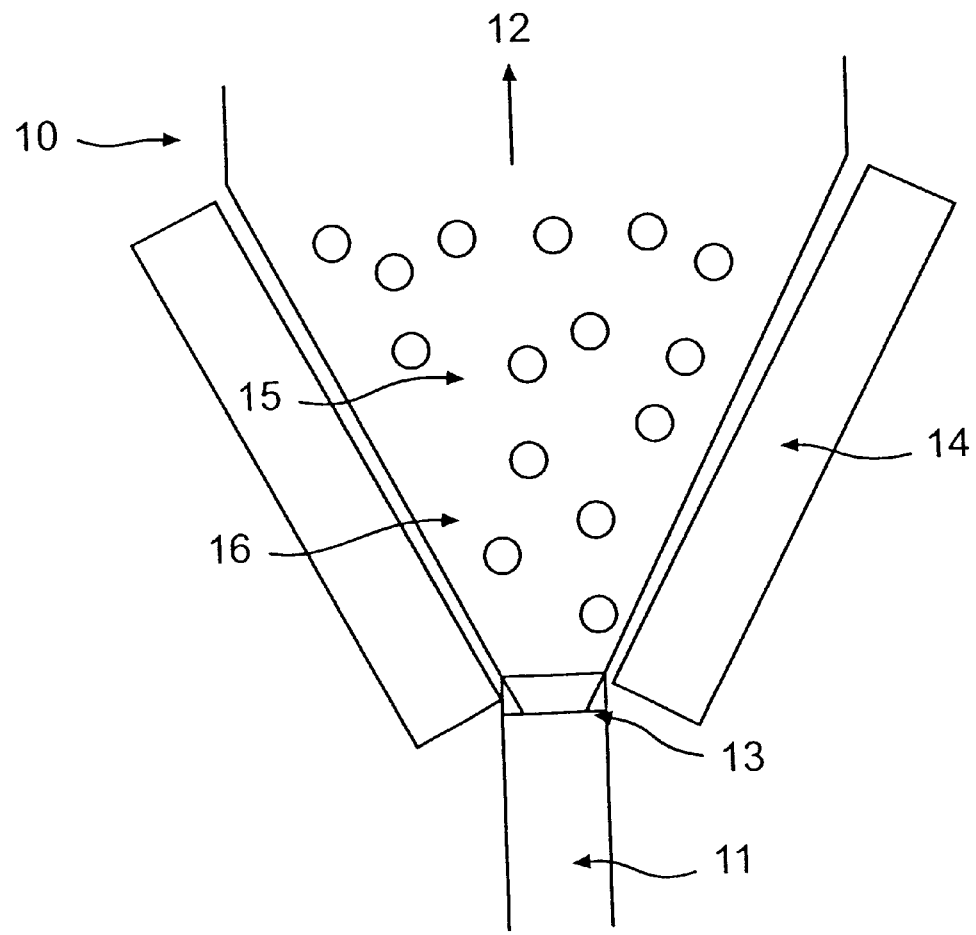
FIG. 1 is a schematic diagram depicting the general structure of a typical vertically mounted, conical fluidized bed reactor.

The invention relates to a method for producing activated, substantially monodisperse, phosphorescent particles and particles formed thereby. The method suspends substantially monodisperse, phosphor-precursor particles in a fluidizing gas and then introduces a reactive gas to contact the suspended phosphor-precursor particles. Heating the suspended phosphor-precursor particles to a reaction temperature then forms unactivated phosphorescent particles. Depending upon the desired, activated, phosphorescent particle, the introduction of the reactive gas may then be discontinued. The unactivated phosphorescent particles suspended within the fluidizing gas are activated by heating the unactivated phosphorescent particles to an activation temperature forming activated, substantially monodisperse, phosphorescent particles. In the method, the activation temperature is greater than or equal to the reaction temperature. The method steps may be conducted as a continuous process or as a batch process.

The method of this invention may be used to produce any type of activated phosphorescent particles, especially those typically produced using a fixed bed process. Phosphorescent particles which may be produced by the method of the invention include, but are not limited to, those described in Luminescent Materials, Ullmann's Encyclopedia of Industrial Chemistry, 5th Edition, Vol. A15, pgs. 519–557, and in Kirk-Othmer Encyclopedia of Chemical Technology, third edition, Volume 14, pp. 527 ff, the disclosure of which is herein incorporated by reference.

Advantageously, the method of the invention maintains the substantially monodisperse nature of the phosphorescent particles from the initial phosphor-precursor particles through the formation of activated phosphorescent particles. Thus, the method of the invention eliminates the need for crushing or milling steps which are necessary in fixed bed processes. "Substantially monodisperse particles" are particles which are substantially unagglomerated and, in general, are predominately spherical in shape. In other words, the majority of phosphorescent particles exist as individual particles in contrast to clusters of two or more phosphorescent particles. Generally, the method of the invention produces yields of greater than 50% of activated, submicron, monodisperse, phosphorescent particles.

In the method of the invention, the phosphorescent particles are kept in constant movement relative to one another (in other words, fluidized) such that intermittent collisions do not offer sufficient time to form permanent interparticle bonds. The phosphor-precursor particles are suspended in a fluidizing gas and are suspended while converting the phosphor-precursor particles to unactivated phosphorescent particles and ultimately to activated phosphorescent particles. The fluidizing gas may be any inert gas, or mixture of inert gases, which does not react with the phosphorescent particles, whether phosphor-precursors, unactivated phosphorescent particles, or activated phosphorescent particles. Preferably, the fluidizing gas is also inert with any reactive gases used or by-products formed in any method step as well as with the materials making up the fluidized bed apparatus. Suitable fluidizing gases include, for example, nitrogen, argon, neon, and helium. Nitrogen and argon are generally preferred. However, the choice of fluidizing gas typically depends on the type of phosphorescent particle being produced, the phosphor-precursors, the reactive gases, and any by-products. Different fluidizing gases may be used in different method steps. To introduce a different fluidizing gas, the suspension may be stopped and the particles suspended in the new fluidization gas. Or, the second fluidizing gas may be gradually introduced while discontinuing the flow of the prior fluidizing gas and, thereby, keeping the particles suspended.

The phosphorescent particles may be suspended in the fluidizing gas using any means typically used to suspend particles in a fluidizing reactor apparatus, such as a fluidized bed or other moving bed reactor. For example, the phosphorescent particles may be suspended by vibratory means, magnetic means, sonic or ultrasonic means, mechanical tumbling, such as in a horizontal rotary kiln, or the flow of the fluidizing gas through the reactor. Typical moving bed reactors include, but are not limited to, rotary kilns, vibrator beds, cascade reactors, jet mills, moving bed furnaces and combinations thereof. Inert particles, such as silica, alumina, nitrides and carbides of alumina or silica, carbon, or ferrite may be used to improve the suspension of the phosphorescent particles and minimize collisions between phosphorescent particles. The inert particles should be readily separated from the activated phosphorescent particles produced in the method. For example, the inert particles may be separated from the phosphorescent particles by using a sieve, by selective dissolution in an appropriate solvent, by elutriation, or by magnetic means if magnetic inert particles are used.

In a preferred embodiment, in each step of the method the phosphorescent particles are suspended by the flow of the fluidizing gas within a fluidized bed reactor (described below). Suspending the phosphorescent particles may be done by increasing the fluidizing gas flow until the majority of the phosphorescent particles are suspended in the fluidized bed. The flow rate of the fluidizing gas may vary depending upon the density, size and shape of the phosphorescent particles, the volume of the area in which the phosphorescent particles are suspended, as well as on the temperature and pressure of the fluidizing gas. Typically, the flow rate of the fluidizing gas may range from 10 cc/min to 750 cc/min. In some instances, sufficiently high flow rates may entrain the phosphorescent particles in the fluidizing gas. The flow rate of the fluidizing gas may be adjusted to compensate for the flow rate of the reactant gas, which is generally a much lower flow rate.

In the method of the invention, substantially monodisperse, phosphor-precursor particles are suspended in the fluidizing gas and converted to substantially monodisperse, unactivated phosphorescent particles. A phosphor-precursor is any material capable of being converted into an unactivated phosphorescent. Unactivated phosphorescent particles have the correct chemical phosphorescent composition but generally do not exhibit sufficient phosphorescence as they lack the correct lattice structure.

Phosphor-precursors may be prepared by methods known in the art, such as, precipitation from purified salt solutions and heating intimate mixtures of reactants. Substantially monodisperse, phosphor-precursors from these processes are suitable for use in the method of the invention. Such methods are described in J. Colloid and Interface Sci., D. Sordelet and M. Akinc, 122 (6), 47 (1988), Luminescent Materials, Ullmann's Encyclopedia of Industrial Chemistry, 5th Edition, Vol. A15, pgs. 519–557 and Zinc and Cadmium Sulphides, Inorganic and Theoretical Chemistry, pgs. 586–612. For example, preparation of substantially monodisperse hydroxycarbonate precursors, generally involves using a dilute solution of a lanthanide water-soluble salt, such as a nitrate, mixed together with water-soluble salts or oxides of the activator/emitter couple in the molar proportions of the phosphorescent particle to be produced. A compound that releases hydroxyl ions by hydrolysis, such as urea, is added to the lanthanide solution. The mixture is then digested until lanthanide hydroxycarbonate particles precipitate. The precipitation of the lanthanide hydroxycarbonate particles continues until the supply of lanthanide salts has been depleted. Actinide ions or yttrium ions may be used in place of the lanthanide ions to form corresponding actinide hydroxycarbonate or yttrium hydroxycarbonate particles. Care should be taken that impurities are not introduced into the phosphor-precursor during their preparation. The presence of impurities may decrease the level of phosphorescence of the final activated phosphorescent particles.

A reactive gas is introduced to convert the phosphor-precursor particles to unactivated phosphorescent particles. This is a chemical conversion in which the stoichiometry of the phosphorescent particle is changed to its final stoichiometry. The reactive gas contacts the suspended phosphor-precursor particles, which are heated to a reaction temperature to form the unactivated phosphor particles. The reactive gas may be introduced as a gas or be generated within the reaction zone by the decomposition of an appropriate reactive gas source material. Preferably, the reactive gas is introduced with the fluidizing gas. Optionally, the introduction of the reactive gas may be discontinued after the formation of unactivated phosphorescent particles.

Reactive gases include, but are not limited to, oxygen-containing gases to form oxide phosphors, sulfur-containing gases to form sulfide phosphors, fluorine-containing gases to form fluoride phosphors, and chlorine-containing gases to form chloride phosphors. Suitable oxygen-containing gases include, but are not limited to, oxygen and water (steam). Suitable sulfur-containing gases include, but are not limited to $H_2S$ and $SO_2$. Mixtures of sulfur-containing gases and oxidant gases including, but not limited to, $O_2$, $H_2O$, NO and $N_2O$ may also be used. Suitable fluorine-containing gases include, but are not limited to, $F_2$, $SF_4$, $SF_6$, HF, $SiF_4$, $TiF_4$, $ZrF_4$, $BF_3$, $BrF_4$ and $CF_4$ or mixtures such as $SiF_4$—$H_2$, $BF_3$—$H_2O$, $SiCl_4$—$H_2O$, $InCl_3$—$SnCl_4.H_2O$, $ZnCl_2$—$AlCl_3.H_2O$, $ZnCl_2$—$H_2O$, $SnCl_4$—$GaCl_3.H_2O$. Suitable chlorine-containing gases include, but are not limited to, $CCl_4$, $SCl_2$, HCl and $Cl_2$. When using mixtures of reactant gases, the gases may be added separately to the moving bed apparatus. The specific reactive gas depends upon the phosphor-precursor and the ultimate activated phosphorescent particles to be formed. Table 1 lists exemplary active phosphorescent compositions, their phosphor-precursor compositions and the reactive gas used in the conversion of the phosphor-precursor. Table 1 also lists the type and/or use of the final phosphorescent composition.

As shown in Table 1 below, some phosphor-precursor particles do not require a reactive gas but undergo a chemical decomposition to form unactivated phosphor particles. Accordingly, another embodiment of the invention relates to a method for producing activated, substantially monodisperse, phosphorescent particles comprising the steps of: suspending substantially monodisperse, phosphor-precursor particles in a fluidizing gas; heating the suspended phosphor-precursor particles to a reaction temperature sufficient to decompose the phosphor-precursor particles and form unactivated phosphorescent particles; and activating the unactivated phosphorescent particles suspended within the fluidizing gas by heating the unactivated phosphorescent particles to an activation temperature to form activated, substantially monodisperse, phosphorescent particles. The activation temperature is greater than or equal to the reaction (decomposition) temperature.

TABLE 1

| Phosphor | Type | Precursor | Reactive Gas |
| --- | --- | --- | --- |
| Aluminates | | | |
| $BaOY_6Al_2O_3$:Mn | PDP | $BaCl_2/YCl_3/AlCl_2$:Mn | $H_2O$ |
| $BaMg_2Al_{16}O_{27}$:Eu | SN | $BaCl_2/MgCl_2/AlCl_2$:Eu | $H_2O$ |
| $Y_3Al_5O_{12}$:Ce | CRT, SN | $YCl_3/AlCl_3$:Ce | $H_2O$ |
| $Y_3(Al, Ga)_5O_{12}$:Ce | CRT | $YCl_3/AlCl_3/GaCl_3$:Ce | $H_2O$ |
| $Y_3(Al, Ga)_5O_{12}$:Th | CRT/FED | $YCl_3/AlCl_3/GaCl_3$:Th | $H_2O$ |

TABLE 1-continued

| Phosphor | Type | Precursor | Reactive Gas |
|---|---|---|---|
| GdAlO$_3$:Ce | SN | GdCl$_3$/AlCl$_3$:Ce | H$_2$O |
| YAlO$_3$:Ce | SN | YCl$_3$/AlCl$_3$:Ce | H$_2$O |
| Borates | | | |
| (Y, Gd)BO$_3$:Eu | PDP | Y(OH)$_3$/Gd(OH)$_3$:Eu | BCl$_3$ |
| InBO$_3$:Eu | CRT | In(OH)$_3$:Eu | BCl$_3$ |
| InBO$_3$:Th | CRT | In(OH)$_3$:Th | BCl$_3$ |
| Fluorides | | | |
| KMgF$_3$:Mn | CRT | K$_2$O/MgO:Mn | HF, CF$_4$, SF$_6$ |
| MgF$_2$:Mn | CRT | MgO:Mn | HF, CF$_4$, SF$_6$ |
| (Zn,Mg)F$_2$:Mn | CRT | ZnO/MgO:Mn | HF, CF$_4$, SF$_6$ |
| YF$_3$:(Yb, Er) | UCP | Y$_2$O$_3$:(Yb, Er) | HF, CF$_4$, SF$_6$ |
| GdF$_3$:(Yb, Er) | UCP | Gd$_2$O$_3$:(Yb, Er) | HF, CF$_4$, SF$_6$ |
| LaF$_3$:(Yb, Ho) | UCP | La$_2$O$_3$:(Yb, Ho) | HF, CF$_4$, SF$_6$ |
| NaYF$_3$:(Yb, Tm) | UCP | Y$_2$O$_3$/NaF:(Yb, Tm) | HF, CF$_4$, SF$_6$ |
| BaYF$_5$:(Yb, Tm) | UCP | Y$_2$O$_3$/BaF$_2$:(Yb, Tm) | HF, CF$_4$, SF$_6$ |
| BaY$_2$F$_8$:(Yb, Th) | UCP | Y$_2$O$_3$/BaF$_2$:(Yb, Th) | HF, CF$_4$, SF$_6$ |
| Oxides | | | |
| ZnO:Zn | CRT, FED | ZnCl$_2$:Zn | H$_2$O, O$_2$ |
|  | CRT | ZnS:Zn | H$_2$O, O$_2$ |
| Y$_2$O$_3$:Eu | CRT, PDP, | YCl$_3$:Eu | H$_2$O, O$_2$ |
|  | FED, UCP | Y(OH)$_2$CO$_3$:Eu | H$_2$O, O$_2$, decomposition inert gas |
| Oxysulfides | | | |
| Gd$_2$O$_2$S:Th | CRT, FED, XI | Gd$_2$O$_3$:Th | H$_2$S/H$_2$O |
| La$_2$O$_2$S:Th | CRT, XI | La$_2$O$_3$:Th | H$_2$S/H$_2$O |
| La$_2$O$_2$S:Eu | XI | La$_2$O$_3$:Eu | H$_2$S/H$_2$O |
| La$_2$O$_2$S:(Yb, Ho) | UCP | La$_2$O$_3$:(Yb, Ho) | H$_2$S/H$_2$O |
| Y$_2$O$_2$S:Th | CRT, XI | Y$_2$O$_3$:Th | H$_2$S/H$_2$O |
| Y$_2$O$_2$S:(Th, Eu) | CRT | Y$_2$O$_3$:(Th, Eu) | H$_2$S/H$_2$O |
| Y$_2$O$_2$S:Eu | CRT | Y$_2$O$_3$:Eu | H$_2$S/H$_2$O |
| Y$_2$O$_2$S:(Yb, Er) | UCP | Y$_2$O$_3$:(Yb, Er) | H$_2$S/H$_2$O |
|  |  | Y$_2$(OH)$_2$CO$_3$:(Yb, Er) | H$_2$S/H$_2$O |
| Gd$_2$O$_2$S:Eu | XI | Gd$_2$O$_3$:Eu | H$_2$S/H$_2$O |
| Gd$_2$O$_2$S:Pr | XI | Gd$_2$O$_3$:Pr | H$_2$S/H$_2$O |
| Gd$_2$O$_2$S:(Yb, Er) | UCP | Gd$_2$O$_3$:(Yb, Er) | H$_2$S/H$_2$O |
| Oxyhalides | | | |
| YOF:(Yb, Tm) | UCP | YOCl:(Yb, Tm) | HF/H$_2$O |
|  |  | Y(OH)$_2$CO$_3$:(Yb, Tm) | HF/H$_2$O |
| Y$_3$OCl$_7$:(Yb, Th) | UCP | Y(OH)$_2$CO$_3$:(Yb, Tm) | HCl/H$_2$O |
| Phosphates | | | |
| Cd$_5$(PO$_4$)$_3$Cl:Mn | CRT | CdCl$_2$:Mn | PCl$_3$/H$_2$O |
| Silicates | | | |
| YSi$_2$O$_5$:(Yb, Ho) | UCP | Y$_2$Si$_3$:(Yb, Ho) | H$_2$O, O$_2$ |
| YSi$_3$O$_7$:(Yb, Tm) | UCP | Y$_2$Si$_3$:(Yb, Tm) | H$_2$O, O$_2$ |
| YSi$_2$O$_5$:Ce | CRT, FED | Y$_2$Si$_3$:Ce | H$_2$O, O$_2$ |
| Zn$_2$SiO$_4$:Mn | CRT, PDP | ZnSi:Mn | H$_2$O, O$_2$ |
| Zn$_2$SiO$_4$:(Mn, As) | CRT | ZnSi:(Mn, As) | H$_2$O, O$_2$ |
| Zn$_2$SiO$_4$:(Mn, In) | CRT | ZnSi:(Mn, In) | H$_2$O, O$_2$ |
|  |  | ZnC:(Mn, In) | Si(OC$_2$H$_5$)$_4$/O$_2$ |
| CaSiO$_3$:(Mn, Pb) | CRT | CaSi:(Mn, Pb) | H$_2$O, O$_2$ |
| Lu$_2$SiO$_5$:Ce | SN | Lu$_2$Si$_3$:Ce | H$_2$O, O$_2$ |
| Sulfides | | | |
| ZnS:Ag | CRT, FED | ZnO:Ag | H$_2$S |
|  |  | ZnS:Ag | NH$_3$/HCl, S$_2$Cl$_2$ |
| (Zn,Cd)S:Ag | CRT, XI | (Zn, Cd)O:Ag | H$_2$S |
|  |  | ZnS/CdS:Ag | NH$_3$/HCl, S$_2$Cl$_2$ |
| ZnS:(Cu, Pb) | LDA | ZnO:(Cu, Pb) | H$_2$S |
|  |  | ZnS:(Cu, Pb) | NH$_3$/HCl, S$_2$Cl$_2$ |
| ZnS:Cu | CRT | ZnO:Cu | H$_2$S |
|  |  | ZnS:Cu | NH$_3$/HCl, S$_2$Cl$_2$ |
| CaS:(Eu, Sm) | LDA | CaO (Eu, Sm) | H$_2$S |
|  |  | Ca(OH)$_2$:(Eu, Sm) | H$_2$S |
| CaS:(Ce, Sm) | LDA | CaO:(Ce, Sm) | H$_2$S |
|  |  | Ca(OH)$_2$: (Ce, Sm) | H$_2$S |
| SrS:(Eu, Sm) | LDA | SrO:(Eu, Sm) | H$_2$S |
| Miscellaneous | | | |
| YGaO$_3$:(Yb, Er) | UCP | Y(OH)$_3$/Ga(OH)$_3$:(Yb, Er) | Decomposition in Inert gas |
| Y$_3$Ga$_5$O$_{12}$:(Yb, Er) | UCP | Y(OH)$_3$/Ga(OH)$_3$:(Yb, Er) | Decomposition in Inert gas |

TABLE 1-continued

| Phosphor | Type | Precursor | Reactive Gas |
| --- | --- | --- | --- |
| CsI:Na | XI, SN | $Cs_2O:Na$ | $AlI_3$ |
| CsI:Tl | XI, SN | $Cs_2O:Tl$ | $AlI_3$ |

UCP = Up-converting (anti-stokes) phosphor
CRT = cathodluminescent phosphor for cathode ray tubes
PDP = phosphor for plasma display panels
FED = cathodluminescent phosphor for field emission displays
XI = phosphor for x-ray imaging
SN = phosphor for scintillation
LDA = phosphor for laser detection and alignment Any conventional means may be used to heat the phosphor-precursor particles in the reaction step and to heat the unactivated phosphorescent particles in the later activation step. For example, the fluidizing gas may be preheated before suspending the phosphorescent particles. Alternatively, the phosphorescent particles may be heated by internal heating coils inside the fluidized reactor tube, external heating coils around the reactor, or by electromagnetic means such as rf, microwave, etc.

The reaction temperature and reaction times will vary with the type of phosphor being prepared and the reaction used to convert the phosphor-precursor to the desired unactivated phosphorescent particle. The preferred reaction temperatures are the lowest reaction temperatures needed to carry out the reaction. The use of the lower reaction temperatures helps to avoid the agglomeration of the unactivated phosphorescent particles. The reaction temperature generally ranges from 500° C. to 900° C. and is lower than the activation temperature. More preferably, the reaction temperature ranges from 700° C. to 900° C. Conversion of the phosphor-precursor particles to the unactivated phosphorescent particles may be done using relatively short reaction times, for example from about one to six hours. Preferably, the reaction time is on the order of one to three hours while the reactive gas and heating is continued for an additional one to two hours to ensure complete conversion of the phosphor-precursor to the unactivated phosphorescent particle. For example, a lanthanide hydroxycarbonate phosphor-precursor may be converted to an unactivated lathanide oxide phosphorescent particle by contacting the hydroxycarbonate phosphor-precursor with oxygen at 750° C. for approximately one hour. A lanthanide oxide phosphor-precursor may converted to an unactivated lanthanide oxysulfide phosphorescent particle by contacting the oxide phosphor-precursor with a hydrogensulfide/water mixture at 850° C. for six hours.

Optionally, after converting the phosphor-precursor particles to the unactivated phosphorescent particles, introduction of the reactive gas may be discontinued. Although the unactivated phosphorescents of the invention may be capable of minor amounts of phosphorescence, a subsequent activation step yields an activated phosphorescent particle. An activated phosphorescent particle has a phosphorescent efficiency of approximately at least two times and preferably at least one order of magnitude greater than its corresponding unactivated phosphorescent particle. As discussed above, a second fluidizing gas may be introduced prior to the activation step. Preferably, the unactivated phosphorescent particles remain suspended while introducing a second fluidizing gas.

In the method of the invention, the activation step heats the unactivated phosphorescent particles to an activation temperature to form activated phosphorescent particles. In this step, it is theorized that the unactivated phosphorescent particles suspended in the fluidizing gas undergo a rearrangement of their lattice structure to give activated phosphorescent particles. The rearrangement may reduce lattice defects and interferences within the particle and allow the ions contained in the particle lattice to move to more stable positions thus exhibiting the desired phosphorescence. The resulting phosphorescent particles are referred to as activated phosphorescent particles.

The temperature necessary to activate the unactivated phosphorescent particles will vary with the type of unactivated phosphorescent particle used. The activation temperature generally ranges from about 800° C. to about 1600° C. Preferably, the activation temperature ranges from 900° C. to 1500° C. In the method, the activation temperature is generally higher than the reaction temperature. However, the activation temperature should be below the melting point of the phosphorescent composition. If the reaction temperature is high enough, some unactivated phosphorescent particles will also be activated at the reaction temperature after conversion from the phosphor-precursor. For example, with some fluoride phosphorescent particles, the reaction temperature ranges from about 500° C. to 900° C. and the activation temperature ranges from about 800° C. to 1000° C. As shown in the examples below, an unactivated lathanide fluoride phosphorescent particles converted from its phosphor-precursor at 900° C., may then be activated at 1000° C. Lanthanide oxysulfide phosphorescent particles may be activated at temperatures of about 1450° C. after conversion of the phosphor-precursors at a reaction temperatures of about 850° C.

In the method of the invention, the phosphorescent particles not only maintain their monodispersity but also, in general, maintain their particle size. Thus, the particle size of the activated phosphorescent particles is substantially the same as the particle size of the phosphor-precursor particles after accounting for densification of the particle structure and changes in stoichiometry during the method. In general, the phosphorescent particles undergo no increase in particle size. The particle size of the phosphorescent particles may even decrease somewhat as phosphor-precursor particles are converted to unactivated phosphorescent particles and the unactivated phosphorescent particles are converted to activated phosphorescent particles. Shrinkage in the particle size can occur due to changes in the lattice structure when activating unactivated phosphorescent particles.

The method of the invention may be used to prepare any size of substantially monodisperse, activated phosphorescent particles. The particle size may be dictated by the end use of the particular phosphorescent particle. For example, the activated phosphorescent particles may have particle sizes ranging from less than one micron to about 50 microns. Preferably the activated phosphorescent particle may range from 0.1 to about 10 microns. Submicron particles, having particles sizes from 0.1 to 1 micron are preferred for use in biological assays and in ink jet ink compositions.

After being activated, the activated phosphorescent particles may be coated with a variety of coatings to improve their physical properties for a particular end use. Coatings can also improve the useful lifetime of the phosphorescent particle by preventing loss of oxygen or other atoms from the phosphorescent lattice. Examples of typical phosphorescent coating materials include metal and non-metal oxides. To coat the activated phosphorescent particles, the suspended, activated, substantially monodisperse, phosphorescent particles are contacted with a vaporized coating precursor at a coating temperature sufficient to form coated activated phosphorescent particles. The coating temperature is generally lower than the activation temperature. Exemplary coatings and coating methods are described in U.S. Pat. Nos. 5,008,422, 5,128,494, 5,149,514, 5,171,734, 5,405,655 and 5,635,250 which are incorporated here by reference in its entirety.

After the activation or coating, the final phosphorescent particles may be cooled by reducing or stopping the addition of heat. In the preferred embodiment, as the phosphorescent particles cool, it is often desirable to reduce the flow rate of any fluidizing gas. After cooling the phosphorescent particles may be collected. The phosphorescent particles may be removed from the fluidized bed apparatus by simply removing them from the apparatus after they have settled to the bottom of the apparatus. The final phosphorescent particles may be separated from any inert fluidization aids, and may be separated on the basis of type, size and/or density.

Any conventional means may be used to separate the final phosphorescent particles so long as the properties of the final phosphorescent particles are not impaired. Typical means of separation include, but are not limited to, magnetic, centrifuge, sieving, field flow fractionation and elutriation. Preferably, the monodisperse final phosphorescent particles are separated from inert fluidization aids and from any agglomerates by placing the final phosphorescent particles in a suitable solvent, such as, water. For example, elutriation is preferred for separation of the final phosphorescent particles from inert fluidization aids, such as carbon. Viscosity gradient centrifugation, such as polyethylene glycol solutions in water, or elutriation is preferred for separation of monodisperse particles from any agglomerates. It is understood that the solvent for the separation step may vary with type of final phosphorescent involved and should also preferably be able to disperse the final phosphorescent particles without promoting aggregation of the particles. For example, it has been found that dimethylsulfoxide and water are suitable solvents for yttrium oxide and yttrium oxysulfide phosphorescent particles. However, as dimethylsulfoxide is more viscous than water the particles will stay suspended longer in dimethylsulfoxide.

Any conventional fluidized bed reactor, absent the particles, capable of being maintained within the desired temperature range may be used in a preferred method of the invention. The apparatus may be either a continuous or batch type apparatus. Suitable fluidized beds for the invention are taught by U.S. Pat. Nos. 5,149,514 and 5,171,734.

The fluidized-bed reactor of the invention is a tube that is preferably heated externally by electrical, flame, radiative, or radio frequency coupled means. The tube may be cylindrical in shaped and mounted either vertically, or horizontally, and may be straight or conical. The contents of the fluidized-bed reactor can be fluidized by either sonic or ultrasonic excitation of the gas inside the reactor, mechanical vibration transmitted through the reactor walls, or more preferably by the flow of a gas through the contents. Vertically mounted beds may have a porous frit mounted in the bottom to allow gasses to be introduced (either for reactive conversion or fluidization of the contents) but which will support the contents from dropping out of the bottom of the bed due to gravity. Preferably the tube is mounted vertically.

FIG. 1 represents a generalized schematic of a fluidized bed, having a vertically mounted, conical reactor tube 10. The reactor tube 10 may consist of one or more pieces held in place by a clamp. The reactor tube 10 has a gas inlet port 11 and a gas exhaust port 12. A porous frit 13 is placed inside the reactor tube 10 above the gas inlet port 11. A heating element 14 is wrapped around the exterior of the reactor tube 11. The phosphorescent particles 15 to be suspended, whether precursor, unactivated or activated phosphorescent particles, are placed on top of the porous frit 13, (e.g., a carbon frit). The phosphorescent particles 15 may be placed on top of the frit by pouring the particles into the top of the reactor tube 10 or if reactor tube 10 consists of more than one piece, the top piece may be removed for the placement of phosphorescent particles 15 onto the porous frit 13.

A gas 16 which may be a fluidizing gas, a reactant gas or a mixture of a fluidizing gas and a reactant gas, enters the reaction tube through inlet port 11 and flows through the porous frit 13 at a rate sufficient to suspend the particles 15. The heating element raises the temperature of the reactor tube which in turn raises the temperature of the gas 16 and the suspended particles 11. The particles are heated to a temperature sufficient to cause precursor phosphor particles to form unactivated phosphorescent particles and unactivated phosphorescent particles to form activated phosphorescent particles. The phosphorescent particles formed in the fluidized bed reactor tube 10 may be extracted through the top of reactor tube 10 or if more than the reactor tube 10 consists of more than one piece, the phosphorescents may be removed by dismantling the reactor tube 10.

The materials of construction of the fluidized-bed reactor are selected on the basis of temperature and potential for reactivity with the contents of the bed or gases used for fluidization, conversion, or coating of the bed contents. The fluidized bed reactor tube generally may consist of a glass, ceramic, or an inert metal. More specifically, the fluidized bed reactor tube may consist of various ceramics, silica, quartz, graphite, teflon, alumina, zirconia, steel, nickel, tungsten, or platinum. Preferably, the reactor tube is quartz or Pyrex® with the most preferred tube being constructed of quartz. The reactor parts may be coated in order to make the contact surfaces inert to the contents of the bed, etc.

The size of the reactor tube may vary depending upon the amount of material involved in the production process. However, care must be used with respect to the transfer of heat in large diameter reactor tubes.

A preferred reactor shape for a fluidized bed is a vertical tube which expands outward above a porous frit, because the linear gas flow rate drops as the gas flows up through the contents of the bed allowing for the simultaneous fluidization of a broader range of particle sizes and densities. This outward expansion forms a powder trap in which there is sufficient gas flow at the bottom of the bed to fluidize the larger and heavier particles, yet the linear gas velocity is small enough at the top of the bed to prevent entrainment of the small and lighter particles. As the flow rate of the gas drops due to the expansion in the diameter of the tube, smaller particles which were entrained in the high flow rate gas begin to fall out of the slow flow rate gas and head back down towards the porous frit.

To prevent particles from adhering to the sides of the reactor tube, the fluidized bed reactor may contain a vibratory means. The vibratory means should cause the reactor tube to vibrate at a high enough rate to prevent particles from adhering to the sides of the reactor tube but not so high as to damage the reactor tube. Furthermore, the vibratory means may reduce or prevent the accumulation of particles in a powder trap.

As discussed above, the fluidized bed may be heated by any conventional means. Suitable heating means include, but are not limited to, preheating the fluidizing gas before it enters the fluidized bed reactor or by internal heating coils within the reactor, external heating coils around the outside of the reactor walls, or by electromagnetic means such as radio frequency, microwave, etc. In a preferred embodiment, the reactor is externally heated by electrical, flame, radiative, or radio frequency coupled means. The temperature of the heating means and of the fluidizing gas may be measured with a thermocouple.

An example of a suitable heater is a sealed oven wrapped around the exterior of a reactor tube. A thermocouple may be placed between the sealed oven and the quartz tube to measure the temperature of the wall of the quartz reactor tube. The presence of the sealed oven allows for inductive heating of the particles being fluidized.

The bed contents consist of phosphor-precursor particles, unactivated phosphorescent particles, activated phosphorescent particles, coated activated phosphorescent particles, reactant gas source material and/or coating source material. In the invention, it is possible to mix the bed contents with an inert particle which can be easily separated from the unactivated, activated or coated phosphorescent particles by mechanical sieving, selective dissolution, or magnetic means. Mixing an inert particle into the bed can help minimize the number of phosphor-phosphor contacts and improve fluidization, particularly if the phosphorescent particles are self-adhesive.

Figure 2:
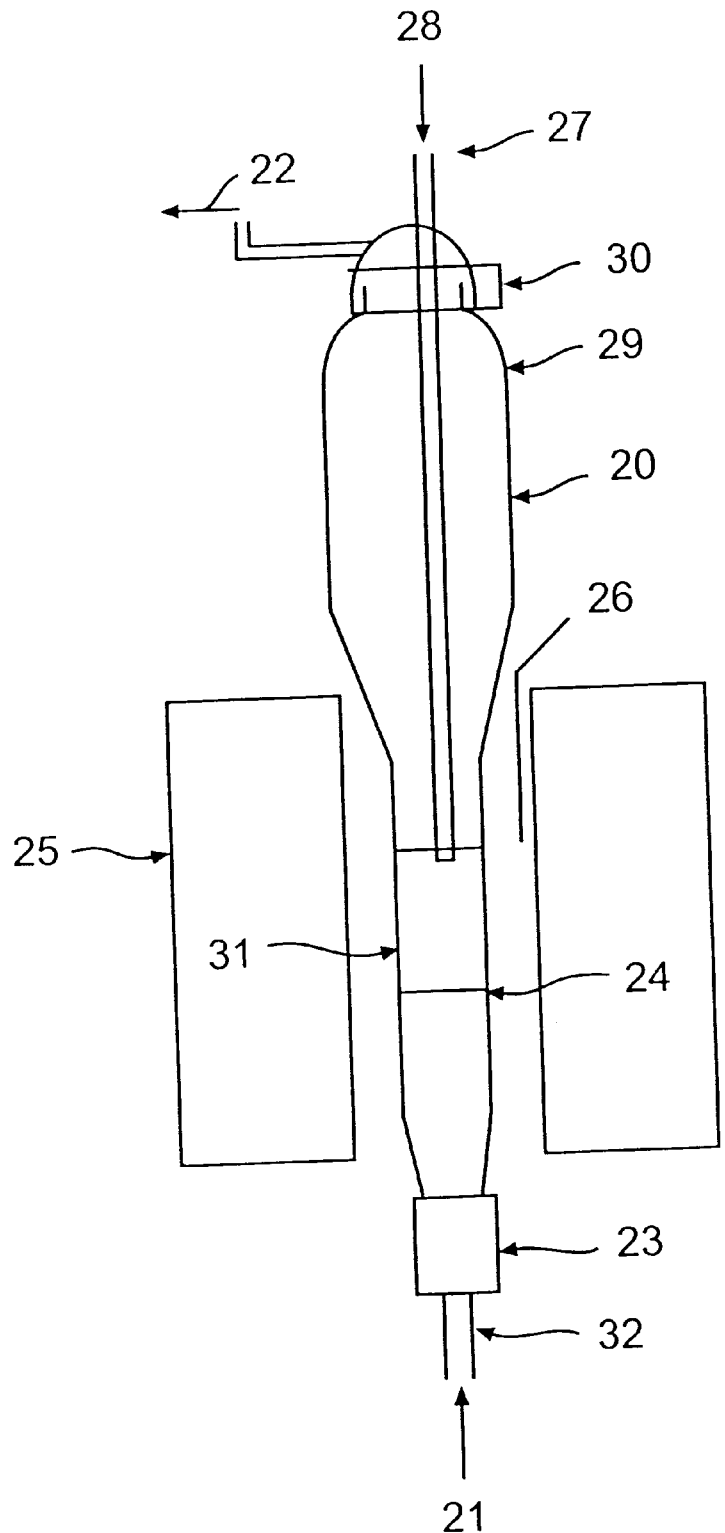
FIG. 2 is a schematic diagram depicting the basic structure of a typical vertically mounted, fluidized bed reactor.

FIG. 2 represents a schematic diagram of a fluidized bed reactor which is suitable for use in the invention. The fluidized bed reactor of FIG. 2 comprises a vertical reactor tube 20. Gases 32 flow from inlet port 21 through a connector 23 and into the reactor tube 20. The gases 32 exit from the reactor tube 20 through outlet port 22.

In the interior of the reactor tube 20 is a porous frit 24 which allows gases 32 to pass upward through the quartz tube while preventing particulate matter from escaping down the tube. The sample 31, i.e. particles to be fluidized, reactive source materials and/or coating source materials, are place on top of the porous frit 24.

Surrounding the middle portion of the reactor tube 20 is a suitable heater 25, for example a sealed oven wrapped around the exterior of the reactor tube. A thermocouple 26 may be placed between the heater 25 and the reactor tube 20 to measure the temperature of the wall of the quartz reactor tube. The presence of the heater 25 allows for conductive and convective heating of the sample 31.

To accurately measure the temperature of the sample 31, a thermocouple 28 may be placed in reactor tube 20. A thermocouple 28 (not shown) may be placed in a thermocouple well 27 which extends from the top end of the reactor tube 20 to just above the porous frit 24. Care should be taken such a thermocouple well 27 is long enough that it extends into the sample 31 but not long enough to touch the porous frit 24.

The upper end of the reactor tube may be wider than the middle section of the reactor tube. For example, in FIG. 2 the upper section of the reactor tube is connected to the middle section of the reactor tube via a 34° angle. The enlarged diameter of reactor tube 20 causes a pressure drop slowing down the velocity of the gases 32 flowing through reactor tube 20. As the gases 32 flow upward through the reactor tube 20 and slow down, entrained particles fall back down the reactor tube 20 rather than being carried out of the top of the reactor tube 20 with the escaping gases 32.

A vibratory means 29 may be connected to reactor tube 20. The vibratory means 29 causes the reactor tube 20 to vibrate and prevents particles from attaching to the interior of the reactor tube 20. Also, a clamp 30 may be connected to the reactor tube 20 to hold the reactor tube in place.

Figure 3:
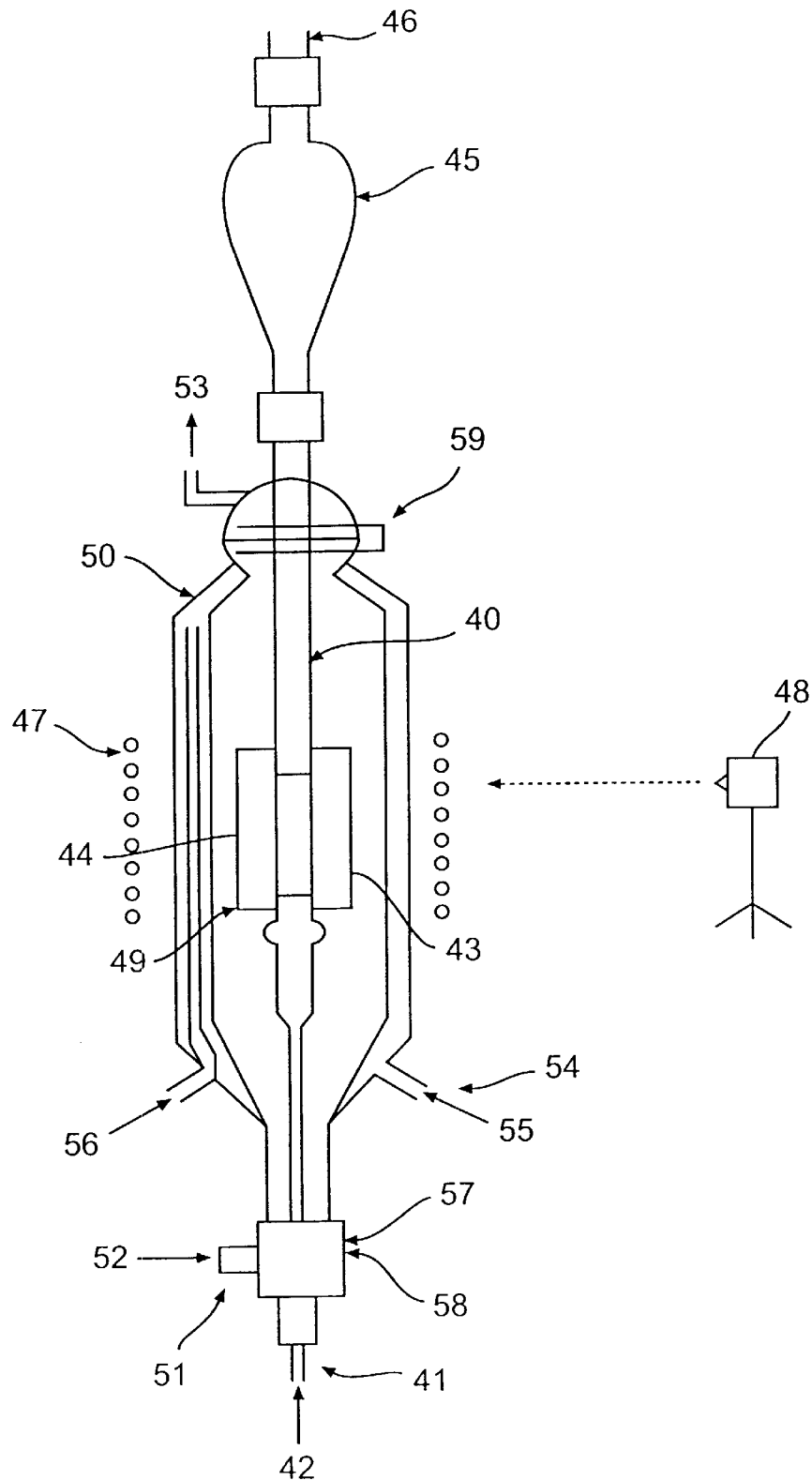
FIG. 3 is a schematic diagram depicting the basic structure of a typical radio frequency heated, fluidized bed reactor.

FIG. 3 represents a schematic diagram of a radio frequency heated, fluidized bed, reactor which is suitable for use in the invention. As shown in fluidized bed reactor of FIG. 3, a cylindrical reactor tube 40 is connected to fluidizing gas inlet port 42 by means of a connector 57 through which a fluidizing gas 41 enters the reactor tube 40. As the fluidizing gas 41 enters the reactor tube 40 it passes up through a porous frit 43 and fluidizes sample 44. As the fluidizing gas 41 fluidizes sample 44 it passes up the reactor tube 40 and through powder trap 45 after which it exits the reactor through fluidizing gas outlet port 46.

The reactor tube 40 is heated by means of radio frequency heating coils 47 which heat susceptor 49 which surrounds reactor tube 40. The temperature of the system is monitored by means of pyrometer 48. To create a heat shield around the reactor tube 40, a condenser 50 surrounds the reactor tube 40 and susceptor 49. A susceptor gas, such as argon, flows through the space created between the condenser 50 and the reactor tube 40 in order to prevent the susceptor from burning. The susceptor gas enters the space between the reactor tube 40 and the condenser 50 through a susceptor gas inlet port 52 and exits through a susceptor gas outlet port 53. A condenser coolant 54 flows through condenser 50. The condenser coolant 54 enters the condenser 50 through a condenser coolant inlet port 55 and exits through condenser coolant outlet port 56.

A vibratory means 58 is attached to connector 57. The vibratory means 58 causes the reactor tube 40 to vibrate which helps to prevent the attachment of the sample to the sides of the reactor tube. A clamp 59 is connected to the condenser 50 and reactor tube 40 to hold them in place.

The following examples are provided to illustrate but not limit the invention. The examples illustrate the preparation of activated, substantially monodisperse, phosphorescent particles according to the invention.

EXAMPLE 1

Excess urea was used to precipitate Y/Yb/Er hydroxycarbonate from a dilute solution (0.05 M) of Y/Yb/Er metal nitrates in the desired phosphorescent atomic ratios.

The solution was heated for about 2 hours at 80–82° C. to generate a blue-colored precipitate suspension which was then separated by centrifuging. The solids were rinsed in methanol and air dried over the weekend. The resulting precipitate had a particle size distribution mass mean diameter (MMD) of 1.34±0.067 mm and a geometric standard deviation ($\sigma_g$) of 2.89±0.17.

The above precipitation procedure was repeated with the exception that the precipitate suspension was cooled over the weekend before being separated by centrifugation. The solids were rinsed in methanol and air dried at 72° C. The resulting precipitate had a particle size distribution MMD of 0.58±0.079 mm and a $\sigma_g$ of 2.77±0.52.

EXAMPLE 2

The precipitation of Y/Yb/Er hydroxycarbonate using excess urea was studied. First, 50 ml of nitric acid was added to a mixture of 3.16 grams $Yb_2O_3$ and 2.30 grams $Er_2O_3$ to form an acid solution. This acid solution was stirred and heated until a clear pink solution was obtained. Forty-five milliliters of water was then added to the acid solution after which the acid solution was allowed to cool to room temperature. Having reached room temperature, 19.66 grams $Y_2O_3$ were slowly added to the acid solution followed by the addition of 5 milliliters of water. The acid solution was then heated until a clear pink solution was obtained. Equal amounts of the clear solution were then poured into two containers having 4.4 liters of water each. These solutions were then heated to about 85° C. or higher to form heated acid solutions. Urea solution comprising 150 grams of urea and 600 ml water were then added to the both of the heated acid solutions. The heated acid solutions were stirred and maintained at 85° C. for five hours and then allowed to cool to room temperature while stirring. Having reached room temperature, stirring was stopped and the particles in the solutions were allowed to settle. The solutions were then centrifuged and the water was siphoned off. The precipitate formed in both solutions was then washed in methanol and dried to yield Y/Yb/Er hydroxycarbonate particles.

EXAMPLES 3–6

Examples 3–6 describe the preparation of fluoride and oxyfluoride, activated, phosphorescent particles in a fluidized bed by heating suspended phosphor-precursor particles to a reaction temperature sufficient to form unactivated phosphorescent particles and then heating the unactivated phosphorescent particles to an activation temperature. A long, dense carbon tube having a porous carbon frit sealed with graphite foil was used as a fluidized bed reactor in Examples 3–6. The reactor comprised a 0.5" diameter tube reactor which was press fit with graphite foil on the top and bottom of the carbon tube reactor. Surrounding the reactor tube was a quartz water jacket. A 450 kHz radio frequency (RF) induction coil was used to heat the carbon fluidized bed reactor directly. Argon gas was passed through the outside of the inner reactor and through the reactor at a rate of one liter per minute.

EXAMPLE 3

This example demonstrates the preparation of oxide and oxyfluoride phosphorescent particles according to the invention. Initially 2.0 grams of (Y, Yb, Er) hydroxycarbonate precursor particles were placed in the carbon tube fluidized bed reactor. The fluidized bed reactor was slowly heated to a reaction temperature of 900° C. while the particles were suspended in an argon fluidizing gas having a flow rate of 100 cc/min. The fluidized bed reactor was maintained at a temperature of 900° C. for one hour with the flow rate of the argon gas being increased to 199 cc/min. The temperature of the fluidized bed reactor was then raised to 1000° C. while adding 16 cc/min of $CF_4$ reactive gas and lowering the flow rate of the argon fluidizing gas. The fluidized bed reactor was maintained at 1000° C. for two hours and then was allowed to slowly cool to room temperature. The resulting product consisted of fine particles and chunks which were off-white in color. The particles were phosphorescent giving off a mostly reddish color with a small amount of green. Using x-ray diffraction $Y_2O_3$ with a trace YOF was detected. Auger electron spectroscopy revealed large peaks for O and F as well as Y, Yb, Er.

EXAMPLE 4

The following process was conducted using the same hydroxycarbonate precursor particles as set forth in Example 3. Also, the fluidized bed reactor was the same as that used in Example 3, except that a longer hot zone was used.

Initially 2.0 grams of the (Y, Yb, Er) hydroxycarbonate precursor particles were placed in carbon tube fluidized bed reactor. The precursor particles were quickly heated to a reaction temperature of 600° C. while being suspended in an argon fluidizing gas having a flow rate of 100 cc/min. A reactive $CF_4$ gas was then added at a flow rate of 28 cc/min while lowering the flow rate of the argon fluidizing gas. The fluidized bed reactor temperature was then slowly raised to 1140° C. The fluidized bed reactor was held at this temperature for two hours and then slowly cooled to room temperature. The resulting product was off-white in color and consisted of fine particles and chunks. The particles were phosphorescent giving off a small amount of phosphorescence which was mostly reddish color with a small amount of green. X-ray diffraction revealed that the particles contained $Y_2O_3$ with a little more YOF than was found in Example 3.

EXAMPLE 5

The following process was conducted using the same hydroxycarbonate precursor particles as set forth in Example 3. Also, the fluidized bed reactor was the same as that used in Example 3, except that a longer hot zone was used.

Initially 2.0 grams of the (Y, Yb, Er) hydroxycarbonate precursor particles were placed in carbon tube fluidized bed reactor. The fluidized bed reactor was slowly raised to a reaction temperature of 773° C. while being suspended in an argon fluidizing gas having a flow rate of 25 cc/min. The fluidized bed reactor was maintained at 773° C. for 75 min. while the particles were suspended in the argon fluidizing gas. While maintaining the flow rate of the argon fluidizing gas, $SF_6$ reactive gas was slowly added until a flow rate of 1.5 cc/min. $SF_6$ was achieved. The fluidized bed reactor was held at 773° C. for 75 min. while the particles were suspended in the 1.5 cc/min $SF_6$ and the 25 cc/min argon fluidizing gas after which the flow rate of $SF_6$ was increased to 4.3 cc/min and the flow rate of the argon fluidizing gas was raised to 83 cc/min. This was continued for 140 min. after which the fluidized bed reactor was allowed to cool to room temperature. Fine off-white particles were obtained. The particles were phosphorescent giving off a large amount of phosphorescence which was a mixture of red and green. X-ray diffraction revealed that the particles contained a combination of $YF_3$ and YOF. The size of the particles ranged from about 0.2 to 1.0 microns.

EXAMPLE 6

The following process was conducted using 1.5 grams of the hydroxycarbonate precursor particles used in Example 3. The hydroxycarbonate particles were ground together with 2.0 grams of Spheron 6 carbon particles which were added as a fluidizing aid. The fluidized bed reactor was the same as that used in Example 3, except that a longer hot zone was used.

Initially 3.5 grams of (Y, Yb, Er) hydroxycarbonate precursor mixed with Spheron 6 carbon was placed in carbon tube fluidized bed reactor. This particle mixture was slowly raised to a reaction temperature of 773° C. while being suspended in an argon fluidizing gas having a flow rate 61 cc/min. The fluidized bed reactor was maintained at this temperature for 90 min. This was followed by slowly adding $SF_6$ reactive gas, while maintaining the flow rate of argon fluidizing gas, until a flow rate of 3.5 cc/min of $SF_6$ was achieved. This process was continued for 255 min. and then the fluidized bed reactor was allowed to cool to room temperature. A fine high surface area black particulate was obtained.

The black particles were separated into a pure white fluoride particulate and a black carbon particulate through the use of polar and nonpolar immiscible solvents. The fluoride particles were then elutriated in a DMSO solution.

The black particulate was only slightly phosphorescent giving off green pin-points when subjected to a laser. In contrast, the white fluoride particulate was highly phosphorescent giving off a bright green dot with a small amount of red. A highly dilute solution of fluoride exhibited a green comet-like laser path when subjected to laser light. X-ray diffraction revealed that the white fluoride particulate was pure $YF_3$. A scanning electron microscope revealed that the particles were smooth and round with few agglomerates. The particles were mostly in the range of 0.2 to 0.6 microns in size. Auger electron spectroscopy of the white particulate revealed large Y and F peaks as well as smaller Yb and Er peaks. Very small O and C peaks were found.

In carrying out examples 3–6, it was found that the melting point of most of the lanthanide fluoride is between 1100° C. and 1200° C. The activation was time-dependent and ranges from about 580 to about 773° C. It was also found that by adjusting the ratio of oxygen to fluorine in the gas flow either fluoride or oxyfluoride particles may be produced. As compared to fluidized bed phosphor processes, it was discovered that fixed bed phosphor processes have limited heat and mass transfer and that agglomeration is a serious problem. Also, wet chemical conversion methods for producing the fluoride directly from the hydroxycarbonate have been found to result in the destruction of the particle geometry and require the removal of water and oxygen from the precursor particles.

EXAMPLE 7

This example demonstrates the formation of an unactivated oxide phosphorescent particle from a (Y, Yb, Er) hydroxycarbonate phosphor-precursor. In this example, 5 grams of (Y, Yb, Er) hydroxycarbonate phosphor-precursor was weighed and lightly ground in a alumina mortar. From this, 4 grams were introduced into the reactor by pouring it in from the top of the reactor. (Reactor FIG. 2). The reactor was then assembled and the vibrator was turned on. The phosphor-precursor particles were suspended in a mixture of 21% nitrogen fluidizing gas and 79% oxygen reaction gas, the gases having a combined flow rate of about 700 cc/min. Some channeling of the fluidizing gas occurred due to some larger clumps present in the sample. The fluidized bed reactor was heated at a rate of 40° C./min to 150° C. to improve fluidization. At this point the now rate of the gas mixture was increased to about 1700 cc/min. to try to break up phosphor-precursor clumps. The fluidized bed reactor was then heated to a reaction temperature of 750° C. and the flow rate was lowered to about 500 cc/min avoid "blowing out" fine particles at higher temperature. These conditions were maintained for one hour after which the phosphorescent particles were allowed to cool down to room temperature. A visual inspection of the bed ensured continuous fluidization during the process.

EXAMPLE 8

A large scale reaction involving the conversion of (Y, Yb, Er) hydroxycarbonate phosphor-precursors to unactivated oxide phosphorescent particles was performed using approximately 30 grams of (Y, Yb, Er) hydroxycarbonate material. The reaction was carried out using the fluidized bed reaction steps described in Example 7 and was sampled at various time points over a two hour period. BET surface area measurements were made on each of the samples to determine their surface areas. The surface area of the phosphor-precursor material was found to decrease slowly with increased reaction time. Surface area measurements were taken at specific intervals. The results are provide below:

| Time | Temp ° C. | Surface area (m$^2$/g) |
| --- | --- | --- |
| .5 hr | 750° | 16.2 |
| 1 hr | 750° | 13.4 |
| 2 hr | 750° | 11.8 |

EXAMPLE 9

The process of reacting an unactivated oxide phosphorescent particle with a sulfur-containing gas to form an unactivated oxysulfide was studied. This example used both the unactivated phosphorescent particles and the fluidized bed reactor from Example 7.

Starting at room temperature the unactivated oxide phosphorescent particles were fluidized using humidified nitrogen. The nitrogen fluidizing gas was humidified by bubbling through a frit immersed in water. The fluidized bed reactor was then heated to 600° C. while checking the flow for complete bed fluidization. After heating the fluidized bed reactor was to 600° C., $H_2S$ reaction gas was introduced and the temperature was raised and held at 850° C. for four hours. The reaction gas was a mixture of 5% $H_2S$ in nitrogen that was diluted to 1% $H_2S$ prior to entering the reactor. The ratio of $H_2S/H_2O$ ratio was 10:1. After the unactivated oxide phosphorescent particles were reacted with $H_2S$ for four hours, the fluidized bed reactor was allowed to cool to 300° C. at which time the flow of $H_2S$ was discontinued and the reactor was cooled to room temperature using only the nitrogen fluidizing gas. A surface area measurement revealed that the oxysulfide particle had diminished in porosity when subjected to 850° C. for six hours. The surface area of the particles after six hours was 7.8 m$^2$/g.

EXAMPLE 10

The process of reacting an unactivated oxide phosphorescent with a sulfur-containing gas to form an unactivated oxysulfide was studied. This example used both the unactivated phosphorescents and the fluidized bed reactor from Example 7.

The sulfidation of the unactivated oxide phosphorescent product of Example 7 was conducted at 850° C. using a 2.5% hydrogen sulfide/water mixture having a 10:1 ratio for six hours. The reaction was sampled at various time points to monitor the sulfidation process. The samples were analyzed using both x-ray diffraction and BET surface area measurements. X-ray diffraction data suggested that the sulfidation of the unactivated oxide phosphorescent particle was complete after about 3–4 hours. The BET surface area data indicated that the surface area remained relatively constant over the 6 hour reaction time. The results of X-ray diffraction of the oxysulfides over specified periods of time in the reactor are provided below:

| Time   | Temp ° C. | Result                     |
|--------|-----------|----------------------------|
| 2 hr   | 850°      | Mix of oxide and oxysulfide |
| 2.5 hr | 850°      | Full oxysulfide            |
| 3 hr   | 850°      | Full oxysulfide            |

The unactivated oxysulfide particles were tested for their up-conversion efficiency (light emission at 550 nm). While heating the unactivated oxysulfide particles at 850° C. for a period of six hours, samples of unactivated oxysulfide particles were removed from the fluidized bed reactor at half hour intervals starting at two hours. The up-conversion efficiency of the samples were measured using a 980 nm laser and were compared to the activated oxysulfide standard. The up-conversion efficiency of the unactivated samples were less than one-tenth that of the activated oxysulfide standard.

EXAMPLE 11

The process of activating unactivated oxysulfide phosphorescent particles to form activated oxysulfide phosphorescent particles was studied. This example used the unactivated oxysulfide phosphorescent particles and the fluidized bed reactor from Example 10.

The unactivated oxysulfide phosphorescent particles from Example 10 were introduced into the top of the fluidized bed reactor of FIG. 3 and the reactor was flushed with argon fluidizing gas at room temperature for ten to thirty minutes to eliminate the presence of oxygen. Visual inspection of the fluidized bed reactor ensured that the particles were fluidized in the argon gas. The fluidized bed reactor was then heated by increasing the power of the RF induction furnace by 5% every two minutes. The temperature of the susceptor which heated the fluidized bed reactor was monitored by a pyrometer which had a working range starting at 1060° C. The temperature of the fluidized bed reactor was allowed to reach an activation temperature of 1450° C. The fluidized bed reactor was held at the activation temperature for thirty minutes to ensure activation of the unactivated oxysulfide phosphorescent particles. The activated oxysulfide phosphorescent particles were then cooled by decreasing power of the RF induction furnace 5% every two minutes.

EXAMPLE 12

The process of activating an unactivated oxysulfide phosphorescent particle of Example 8 was studied. The process used the same steps and fluidized bed reactor as Example 11 with the following exceptions.

Two gram samples of unactivated oxysulfide phosphorescent particles from Example 8 were heated to either 1350° C. or 1415° C. for 15, 30, 45, 60, or 120 minutes. The phosphorescent efficiency of the samples was measured using infrared lasers. The unactivated oxysulfides heated to a temperature of 1415° C. for 45 to 120 minutes exhibited the highest phosphorescent efficiency. Indeed, it was discovered that the efficiency of the phosphorescent particle was not adversely affected by long firing times. However, it is expected that subjecting monodisperse materials too long firing times would result in lower yields due to sintering and agglomeration of the particles.

EXAMPLE 13

The following example describes a process of forming activated, oxysulfide phosphorescent particles.

Five grams of (Y, Yb, Er) hydroxycarbonate phosphor-precursor particles were highly ground in a mortar and pestle. Four grams of the hydroxycarbonate phosphor-precursor particles were poured into a small quartz fluidized bed reactor. A mixture of 79% nitrogen fluidizing gas and 21% oxygen reaction gas was introduced into the reactor at a rate of 500 cc/min to suspend the hydroxycarbonate phosphor-precursor particles. The reactor temperature was then raised to 150° C. to remove any physiabsorbed water. The reactor temperature was then increased at a rate of 30–40° C./min until a temperature of 750° C. was reached. The reactor temperature was held at 750° C. for one hour to convert the hydroxycarbonate phosphor-precursor particles to unactivated oxide phosphorescent particles. The reactor was then allowed to cool to 40° C. The unactivated oxide phosphorescent particles were removed from the reactor and weighed. About 2.4 grams unactivated phosphorescent particles were obtained.

Two grams of the unactivated phosphorescent particles were placed in a small quartz fluidized bed reactor. The reactor was raised to 200° C. to remove any water. The temperature was then raised at a rate of 40° C./min and at a rate of 8° C./min at higher temperatures until a temperature of 850° C. was reached. A mixture of $H_2S/H_2O$ reaction gas and nitrogen fluidizing gas was used to suspend the unactivated oxide phosphorescent particles in the reactor. The flow rates were 100 cc/min of 5% $H_2S$ in $N_2$, 23 cc/min $H_2O$ and 380 cc/min $N_2$. The unactivated oxide phosphorescent particles were maintained at 850° C. for four hours after which the introduction of the $H_2S/H_2O$ was discontinued and the reactor was allowed to cool down to 32° C.

To activate the unactivated oxysulfide phosphorescent particles, 1.5 grams of the unactivated oxysulfide particles were placed in a small quartz fluidized bed reactor. The reactor was then flushed with an argon fluidizing gas for 25 minutes to remove any oxygen which was present. The reactor was then heated to an activation temperature of 1450° C. The unactivated oxysulfide phosphorescent particles were then activated at 1450° C. for 30 minutes. The reactor was then allowed to cool down at a rate of about 40° C. per minute to room temperature, although it was observed that the rate of cooling was not linear due to heat transfer limitations. 1.45 grams of activated oxysulfide phosphorescent particles were recovered. The recovered activated oxysulfide particles were 50% more phosphorescent than a reference oxysulfide phosphorescent sample previously produced by the fluidized bed process. The recovered activated oxysulfide particles were elutriated in dimethyl sulfoxide. The results are shown in Table 1 below.

TABLE 1

| | Compositions (mol %) | | | Percent Yield | Relative | Percent Yield | Particle Size (mm) | | | | Surface Area | Processing |
|---|---|---|---|---|---|---|---|---|---|---|---|---|
| | Y | Yb | Er | Monodisperse | Activity | Submicron | MMD | +/− | $\sigma_g$ | +/− | (m²/g) | Conditions |
| YYbEr Hydroxycarbonate | 0.86 | 0.08 | 0.06 | 100 | None | 100 | 0.514 | 0.028 | 1.47 | 0.07 | | Excess urea precipitation |
| YYbEr Oxide | 0.88 | 0.08 | 0.06 | N/A | None | 100 | 0.48 | 0.023 | 1.93 | 0.09 | 15.76 | 1 hour at 750° C. |
| YYbEr Oxysulfide | 0.86 | 0.08 | 0.06 | N/A | Low | n/a | 0.562 | 0.012 | 2.05 | 0.05 | | 4 hours at 850° C. |
| YYbEr Oxysulfide | 0.86 | 0.08 | 0.06 | N/A | | n/a | | | | | | 30 minutes at 1450° C. |
| YYbEr Oxysulfide (Elutriated) | 0.87 | 0.07 | 0.06 | 18.2 | 1.5 | | 0.403 | 0.01 | 1.85 | 0.05 | | DMSO Elutriated |

EXAMPLE 14

The following example describes a process of forming activated, oxysulfide phosphorescent particles. This example used the procedures from Example 13 but on a larger scale. Thirty grams of hydroxycarbonate phosphor-precursor particles were poured into a quartz fluidized bed reactor. Following the fluidized bed procedures from Example 13, the hydroxcarbonate particulate was first decomposed to an oxide phosphor-precursor which was reacted at a reaction temperature to form an unactivated oxysulfide phosphorescent particle. This unactivated oxysulfide phosphorescent particle was then activated to form an activated oxysulfide phosphorescent particle. The results are shown in Table 2 below.

EXAMPLE 16

The following example describes a process of separating activated, oxysulfide phosphorescent particles using field flow fractionation techniques. Activated, oxysulfide phosphorescent particles produced by the process of Example 13 were tested for their particle size distribution following their fractionation. The field flow fractionator used in this example was a commercially available SPLITT cell field flow fractionator obtained from FFFractionation, LLC (Salt Lake City, Utah).

The activated oxysulfide phosphorescent particles were suspended in an aqueous solution of sodium hexametaphosphate. The suspension of activated, oxysulfide phosphorescent particles were pumped into the top of the SPLITT cell

TABLE 2

| | Compositions (mol %) | | | | Percent Yield | Particle Size (mm) | | | |
|---|---|---|---|---|---|---|---|---|---|
| | Y | Yb | Er | Recovery (g) | Monodisperse | MMD | +/− | $\sigma_g$ | +/− |
| YYbEr Oxide (Top Fraction) | 0.86 | 0.08 | 0.06 | 1.43 | 8 | 0.26 | nd | nd | nd |
| YYbEr Oxide (Bottom Fraction) | 0.86 | 0.08 | 0.06 | 13.46 | 83 | 0.36 | nd | nd | nd |
| Total | | | | 14.89 | 91 | | | | |
| YYbEr Oxysulfide (Top Fraction) | 0.86 | 0.08 | 0.06 | 0.73 | 5 | 0.19 | 0.01 | 1.96 | 0.09 |
| YYbEr Oxysulfide (Bottom Fraction) | 0.86 | 0.08 | 0.06 | 12.97 | 90 | 0.31 | 0.01 | 2.03 | 0.01 |
| Total | | | | 13.7 | 95 | | | | |

EXAMPLE 15

Figure 4:
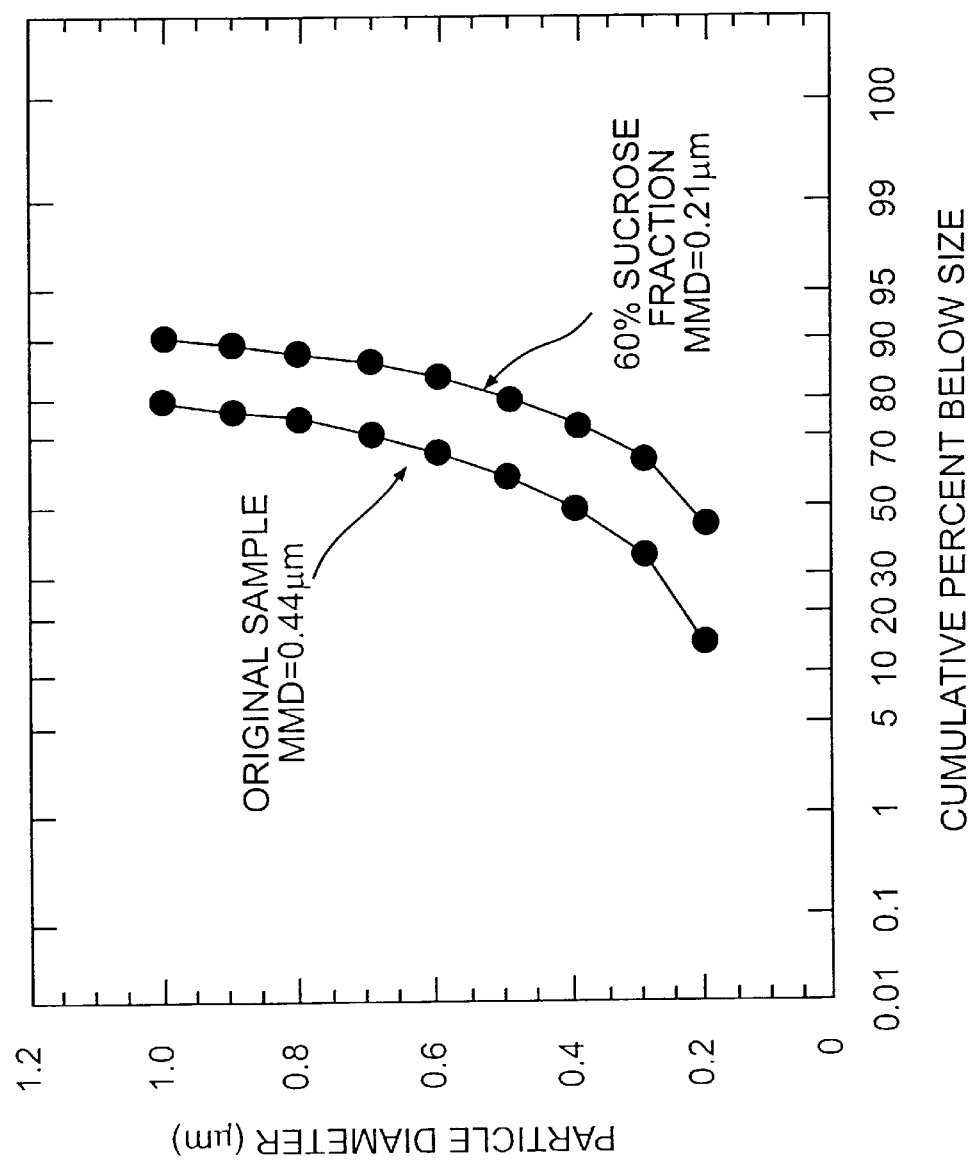
FIG. 4 is a graph depicting the results of viscosity gradient centrifugation of activated, oxysulfide phosphorescent particles in a 60 wt % sucrose solution.

The following example describes a process of separating activated, oxysulfide phosphorescent particles using centrifugation. Sucrose solutions of 20/40/60 weight percent sucrose, and thus different viscosities, were placed into a centrifuge tube. Activated, oxysulfide phosphorescent particles produced by the process of Example 13 were also placed into the centrifuge tube. The centrifuge tube was then subjected to a centrifugal force, i.e, revolved at a high speed to impart a force greater than gravity. Larger activated, oxysulfide phosphorescent particles were contained in the higher viscosity, higher weight percent sucrose solutions whereas smaller activated, oxysulfide particles remained in the lower viscosity, lower weight percent sucrose solutions. After the centrifuge was stopped, the top and bottom fractions of the sucrose solution were removed from the centrifuge tube with a pipette. The top and bottom fractions were then individually subjected to an ultracentrifuge process washed in methanol and allowed to dry. The results of the viscosity gradient centrifugation from the original sample and centrifuged 60 weight percent sucrose solution are depicted in FIG. 4.

as a feed solution. An aqueous solution of sodium hexametaphosphate was pumped into the bottom of the SPLITT cell as a carrier solution. Separation of the large and small particles was achieved by differential transport of the feed solution perpendicular to differential transport by the force of gravity. An outlet splitter at the end of the SPLITT cell separated the flow stream into a top and bottom fraction.

Figure 5:
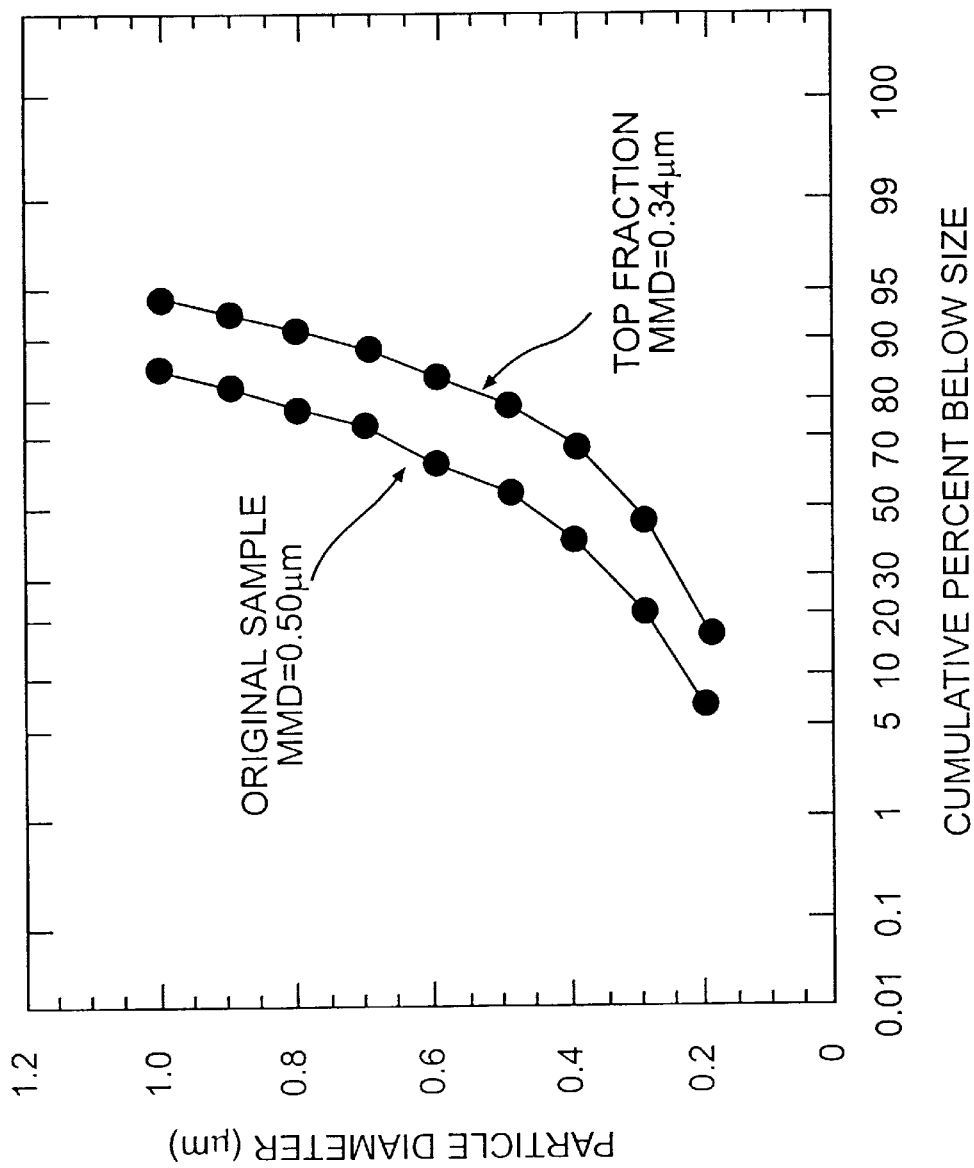
FIG. 5 is a graph depicting the results of a field flow fractionation separation process employing activated, oxysulfide phosphorescent particles.

The top and bottom fractions were individually subjected to an ultracentrifuge process, washed in methanol and allowed to dry. The particles were then tested for their mean mass diameter. The results of the field flow fractionation are depicted in FIG. 5.

EXAMPLES 17–18 AND COMPARATIVE EXAMPLES 1 AND 2

In the following examples and comparative examples, a standard phosphor, P-22 blue TV, ZnS/Ag, Cl, was compared with a chlorine doped ZnS phosphorescent particle formed by a fixed bed process and chlorine doped ZnS phosphorescent particles formed in a fluidized bed process. In conducting Examples 17–18 and Comparative Example 1, zinc sulfide, 99.99% from Alfa and reagent-grade chemicals including silver nitrate, sodium chloride, ammonium chloride, anhydrous hydrogen chloride, and anhydrous ammonia were used. The sulfur monochloride, 98%, was purchased from Aldrich.

COMPARATIVE EXAMPLE 1

A sample of ZnS doped with 0.1 mole % Ag, 5 mile % Cl was prepared by a standard slurry/evaporation method. This ZnS/Ag, Cl mixture was fired in covered charcoal-packed alumina crucible at 900° C. Less than 10% phosphorescence was measured using an ultraviolet light source having a wavelength of 254 nm as compared to the standard P-22 blue TV phosphor was observed for this sample. The probable reason is the loss of zinc chloride, which boils at 732° C.

COMPARATIVE EXAMPLE 2

Chloride doping of ZnS has been reported to form an active down-converting phosphorescent particle. A chlorine doped ZnS sample was prepared by dry mixing ZnS with 10 wt. % ammonium chloride. This ZnS, ammonium chloride mixture was activated in a muffle furnace fixed bed at 900° C. The resulting activated showed improved phosphorescent activity when exposed to ultraviolet light having a wavelength of 254 nm. The phosphorescence was equal to or slightly greater than 50% of the standard P-22 phosphor phosphorescence.

EXAMPLE 17

This example demonstrates the phosphorescence of a phosphorescent particle formed from ammonium chloride and ZnS which has been activated in a fluidized bed.

A 1.5 g sample of ZnS was fluidized in a quartz fluidized bed reactor at 900° C. Approximately equal molar amounts of 100% anhydrous hydrogen chloride and ammonia were mixed immediately below the porous quartz support disk in the quartz fluidized bed reactor. This exposed the ZnS to an equilibrium mixture of $HCl/NH_3/NH_4Cl$ at 900° C. (mostly dissociated $NH_4Cl$). Because large amounts of $NH_4Cl$ formed at the cooler exit port of the quartz fluidized bed reactor, the reaction could only be carried out for about 15 minutes before plugging occurred. After removing the plug, the quartz fluidized bed reactor was cooled in a nitrogen fluidizing gas. The activated chlorine doped ZnS phosphorescent particles exhibited good phosphorescence, greater than 50% as compared to the standard P-22, and about the same as the fixed bed ammonium chloride sample above.

EXAMPLE 18

This example demonstrates the phosphorescence of a phosphorescent particle formed from sulfur monochloride and ZnS which has been activated in a fluidized bed.

A nitrogen gas bubbler system was used to vapor transport sulfur monochloride into a quartz fluidized bed reactor in the presence of fluidized ZnS. A reaction between the ZnS and the sulfur monochloride was conducted at 900° C. in the presence of 1.5 g ZnS and sulfur monochloride vapor in a nitrogen fluidizing gas. The resulting chlorine doped ZnS phosphorescent particle exhibited good phosphorescence, at least 50% or greater as compared to the standard P-22.

The particles formed in Examples 17–18 were studied using a scanning electron microscope. The results of which are provided below.

| Material | | SEM |
|---|---|---|
| Comp. Ex. 1. | Standard P-22 | 3–15 microns (crystalline) |
| | Starting ZnS | 4 micron clusters (amorphous) |
| Comp Ex. 2 | Fixed-bed $ZnS/NH_4Cl$ | |
| Ex. 17 | Fluidized-bed $ZnS/NH_4Cl$ | 1–2 microns (crystalline) |
| Ex. 18 | Fluidized-bed $ZnS/S_2Cl_2$ | 4–15 micron clusters (amorphus) |

EXAMPLE 19

The time, temperature, and chemical environment dependence of the activation of phosphorescent particles was studied. Two grams of $(Y, Yb,Er)_2O_2S$ particles that had previously been decomposed and sulfided at 750° C. in synthetic air (a mixture of $N_2$ and $O_2$) for one hour and at 850° C. in $H_2S/H_2O$ for six hours was activated at 1100° C. for 2 days in $H_2S/H_2O$. The initial phosphorsance was low. However, after the low temperature activation in a reactive gas mixture, the particles qualitatively had the same brightness as other samples activated at high temperature in argon gas. All other properties of this particulate were also qualitatively the same as the samples activated at high temperature in argon gas. This experiment demonstrated that for some phosphors the activation temperature can be equal to the reaction temperature. Thus, it was determined that activation is time, temperature, and chemical environment dependent.

What is claimed is:

1. A method for producing activated, substantially monodisperse, phosphorescent particles comprising the steps of:

suspending substantially monodisperse, phosphor-precursor particles in a fluidizing gas;

introducing a reactive gas to contact the suspended phosphor-precursor particles;

heating the suspended phosphor-precursor particles to a reaction temperature sufficient to form unactivated phosphorescent particles;

discontinuing the introduction of the reactive gas; and activating the unactivated phosphorescent particles suspended within the fluidizing gas by heating the unactivated phosphorescent particles to an activation temperature to form activated, substantially monodisperse, phosphorescent particles, wherein the activation temperature is greater than or equal to the reaction temperature and wherein the reaction temperature ranges from about 500 to about 900° C.

2. A method of claim 1, wherein the reactive gas is introduced in conjunction with the fluidizing gas.

3. A method of claim 1, further comprising prior to the activation step, the steps of discontinuing the fluidizing gas from the suspension step; and introducing a second fluidizing gas.

4. A method of claim 3, wherein the unactivated phosphorescent particles remain suspended while discontinuing the fluidizing gas from the suspension step and introducing the second fluidizing gas.

5. A method of claim 1, wherein the reaction temperature ranges from about 500 to about 900° C. and the activation temperature ranges from about 800 to about 1600° C.

6. A method of claim 1, after the activation step, further comprising the step of:

contacting the suspended, activated, substantially monodisperse, phosphorescent particles with a vaporized coating precursor at a coating temperature sufficient to form coated activated phosphorescent particles, and wherein the coating temperature is lower than the activation temperature.

7. A method of claim 1, wherein the substantially, monodisperse, phosphor-precursor particles range in size from about 0.1 to about 50 microns, and the activated, substantially monodisperse, phosphorescent particles range in size from about 0.1 to about 50 microns.

8. A method of claim 1, wherein the method steps are carried out in a fluidized bed reactor tube.

9. The method of claim 1, wherein the phosphor-precursor particle is a hydroxycarbonate containing a metal ion selected from a group comprising lanthanide metal ions and actinide metal ions.

10. The method of claim 9, wherein the reactive gas is an oxygen containing gas and the activated, substantially monodisperse, phosphorescent particles are oxide phosphorescent particles.

11. The method of claim 1, wherein the phosphor-precursor particles an oxide phosphor-precursor particles and the reactant gas is hydrogen sulfide.

12. The method of claim 11, wherein the activated, substantially monodisperse, phosphorescent particles are an sulfide phosphorescent particles.

13. The method of claim 1, wherein the phosphor-precursor particles are oxide phosphor-precursor particles and the reactant gas is a mixture of hydrogen sulfide and an oxidant selected from the group comprising $H_2O$, $O_2$, NO, $N_2O$ and mixtures thereof.

14. The method of claim 13, wherein the activated, substantially monodisperse, phosphorescent particles are oxysulfide phosphorescent particles.

15. The method of claim 1, wherein the phosphor-precursor particles are oxide phosphor-precursor particles and the reactant gas is a halide-containing gas.

16. The method of claim 15, wherein the halide-containing gas is selected from a group comprising $F_2$, $SF_4$, $SF_6$, HF, $SiF_4$, $TiF_4$, $BrF_4$, $BF_3$, $ZrF_4$, $CF_4$, $SiF_4$—$H_2$, $BF_3$—$H_2O$, $SiCl_4$—$H_2O$, $InCl_3$—$SnCl_4.H_2O$, $ZnCl_2$—$AlCl_3.H_2O$, $ZnCl_2$—$H_2O$ and $SnCl_4$—$GaCl_3.H_2O$.

17. The method of claim 16, wherein the activated, substantially monodisperse, phosphorescent particles are oxyfluoride phosphorescent particles.

18. The method of claim 1, wherein the phosphor-precursor particles are zinc sulfide precursor particle and the reactant gas is a chlorine-containing gas.

19. A method of claim 1, wherein the method steps are carried out in a moving bed reactor.

20. A method of claim 1, wherein the activated, substantially monodisperse, phosphorescent particles have a particle size of less than 1 micron.

21. A method of claim 1, wherein the substantially, monodisperse, phosphor-precursor particles range in size from about 0.1 to about 1.0 micron, and the activated, substantially monodisperse, phosphorescent particles range in size from about 0.1 to about 1.0 micron.

22. A method for producing activated, substantially monodisperse, phosphorescent particles comprising the steps of:

suspending substantially monodisperse, phosphor-precursor particles in an inert fluidizing gas;

introducing a reactive gas to contact the suspended phosphor-precursor particles;

heating the suspended phosphor-precursor particles to a reaction temperature sufficient to form unactivated phosphorescent particles; and activating the unactivated phosphorescent particles suspended within the fluidizing gas by heating the unactivated phosphorescent particles to an activation temperature to form activated, substantially monodisperse, phosphorescent particles having a particle size of less than about 10 microns, and wherein the activation temperature is greater than or equal to the reaction temperature.

23. A method of claim 22, wherein the reactive gas is introduced in conjunction with the fluidizing gas.

24. A method of claim 22, further comprising, prior to the activation step, the step of introducing a second fluidizing gas.

25. A method of claim 24, wherein the unactivated phosphorescent particles remain suspended while discontinuing the fluidizing gas from the suspension step and introducing the second fluidizing gas.

26. A method of claim 22, wherein the reaction temperature ranges from about 500 to about 900° C. and the activation temperature ranges from about 800 to about 1600° C.

27. A method of claim 22, after the activation step, further comprising the step of:

contacting the suspended, activated, substantially monodisperse, phosphorescent particles with a vaporized coating precursor at a coating temperature sufficient to form coated activated phosphorescent particles, and wherein the coating temperature is lower than the activation temperature.

28. A method of claim 22, wherein the method step are carried out in a fluidized bed reactor tube.

29. A method of claim 22, wherein the substantially, monodisperse, phosphor-precursor particles range in size from about 0.1 to about 1.0 micron, and the activated, substantially monodisperse, phosphorescent particles range in size from about 0.1 to about 1.0 micron.

30. A method of claim 22, wherein the activated, substantially monodisperse, phosphorescent particles have a particle size of less than 1 micron.

31. A method for producing activated, substantially monodisperse, phosphorescent particles comprising the steps of:

suspending substantially monodisperse, unactivated phosphorescent particles in an inert fluidizing gas; and, activating the suspended, unactivated phosphorescent particles by heating the unactivated phosphorescent particles to an activation temperature to form activated, substantially monodisperse, phosphorescent particles having a particle size of less than about 10 microns.

32. A method of claim 31, wherein the substantially, monodisperse, phosphor-precursor particles range in size from about 0.1 to about 1.0 micron, and the activated, substantially monodisperse, phosphorescent particles range in size from about 0.1 to about 1.0 micron.

33. A method of claim 31, wherein the activated, substantially monodisperse, phosphorescent particles have a particle size of less than 1 micron.

34. A method for producing activated, substantially monodisperse, phosphorescent particles comprising the steps of:

suspending substantially monodisperse, phosphorescent-precursor particles in an inert fluidizing gas;

heating the suspended phosphorescent-precursor particles to a reaction temperature sufficient to decompose the phosphorescent-precursor particles and form unactivated phosphorescent particles; and activating the unactivated phosphorescent particles suspended within the fluidizing gas by heating the unactivated phosphorescent particles to an activation temperature to form activated, substantially monodisperse, phosphorescent particles having a particle size of less than about 10 microns, and wherein the activation temperature is greater than or equal to the reaction temperature.

35. A method of claim 24, further comprising prior to the activation step, the steps of discontinuing the fluidizing gas from the suspension step; and introducing a second fluidizing gas.

36. A method of claim 24, wherein the unactivated phosphorescent particles remain suspended while discontinuing the fluidizing gas from the suspension step and introducing the second fluidizing gas.

37. A method of claim 34, wherein the reaction temperature ranges from about 500 to about 900° C. and the activation temperature ranges from about 800 to about 1600° C.

38. A method of claim 34, after the activation step, further comprising the step of:

contacting the suspended, activated, substantially monodisperse, phosphorescent particles with a vaporized coating precursor at a coating temperature sufficient to form coated activated phosphorescent particles, and wherein the coating temperature is lower than the activation temperature.

39. A method of claim 34, wherein the method step are carried out in a fluidized bed reactor tube.

40. A method of claim 34, wherein the substantially, monodisperse, phosphor-precursor particles range in size from about 0.1 to about 1.0 micron, and the activated, substantially monodisperse, phosphorescent particles range in size from about 0.1 to about 1.0 micron.

41. A method of claim 39, wherein the activated, substantially monodisperse, phosphorescent particles have a particle size of less than 1 micron.

* * * * *

UNITED STATES PATENT AND TRADEMARK OFFICE
CERTIFICATE OF CORRECTION

PATENT NO. : 6,039,894
DATED : March 21, 2000
INVENTOR(S) : Angel Sanjuro et al.

It is certified that error appears in the above-identified patent and that said Letters Patent is hereby corrected as shown below:

Column 1,
Line 3, before "FIELD OF INVENTION", please insert:

STATEMENT REGARDING FEDERALLY SPONSORED
RESEARCH OR DEVELOPMENT

-- This invention was made with Government support under Contract No. DASG60-95-C-0098, awarded by the U.S. Army. The Government has certain rights in this invention. --

Signed and Sealed this

Twenty-fifth Day of December, 2001

Attest:

Attesting Officer

JAMES E. ROGAN
*Director of the United States Patent and Trademark Office*